US009049486B2

(12) United States Patent
Ohashi

(10) Patent No.: US 9,049,486 B2
(45) Date of Patent: Jun. 2, 2015

(54) INFORMATION PROCESSING APPARATUS, INFORMATION PROCESSING METHOD, PROGRAM, AND INFORMATION PROCESSING SYSTEM

(75) Inventor: Yoshinori Ohashi, Tokyo (JP)

(73) Assignee: Sony Corporation (JP)

(*) Notice: Subject to any disclaimer, the term of this patent is extended or adjusted under 35 U.S.C. 154(b) by 307 days.

(21) Appl. No.: 13/564,106

(22) Filed: Aug. 1, 2012

(65) Prior Publication Data

US 2013/0041978 A1    Feb. 14, 2013

(30) Foreign Application Priority Data

Aug. 9, 2011  (JP) .................................. 2011-173931

(51) Int. Cl.
*G06F 15/16* (2006.01)
*H04N 21/4722* (2011.01)
*H04N 21/84* (2011.01)

(52) U.S. Cl.
CPC ........... *H04N 21/4722* (2013.01); *H04N 21/84* (2013.01)

(58) Field of Classification Search
USPC ............................. 709/217; 380/269; 711/162
See application file for complete search history.

(56) References Cited

U.S. PATENT DOCUMENTS

| 7,164,767 B2* | 1/2007 | Abe et al. ...................... 380/269 |
| 7,774,621 B2* | 8/2010 | Morino et al. ................ 713/193 |
| 7,936,877 B2* | 5/2011 | Abe et al. ...................... 380/269 |
| 2007/0110243 A1* | 5/2007 | Abe et al. ...................... 380/269 |
| 2009/0132546 A1* | 5/2009 | Kurata et al. .................... 707/10 |
| 2009/0235302 A1* | 9/2009 | Fukuda et al. ................... 725/30 |
| 2012/0200951 A1* | 8/2012 | Koda et al. ...................... 360/15 |
| 2012/0311281 A1* | 12/2012 | Jeong et al. .................... 711/162 |

FOREIGN PATENT DOCUMENTS

JP        2009225070 A    10/2009

* cited by examiner

*Primary Examiner* — Tammy Nguyen
(74) *Attorney, Agent, or Firm* — Lerner, David, Littenberg, Krumholz & Mentlik, LLP

(57) ABSTRACT

An information processing apparatus includes: an acquisition target content determination unit that determines an acquisition target content item which is a target acquired by a content acquisition unit among related content items related to a reference content item, on the basis of processing performance of the content acquisition unit which acquires various content items via a communication network and can communicate with a content presentation control unit which performs a control so as to present the reference content item; and an acquisition processing unit that causes the content acquisition unit to acquire the acquisition target content item.

10 Claims, 13 Drawing Sheets

FIG.4

| WEB SERVICE NAME | META-INFORMATION (KEYWORD) | STATE |
|---|---|---|
| WEB SERVICE A | "CHARACTER a" "DIRECTOR b" ... | ACQUIRED |
| WEB SERVICE B | "CHARACTER a" "DIRECTOR b" ... | RESERVED |
| WEB SERVICE C | "CHARACTER a" "DIRECTOR b" ... | NON-ACQUIRED |
| ... | ... | ... |

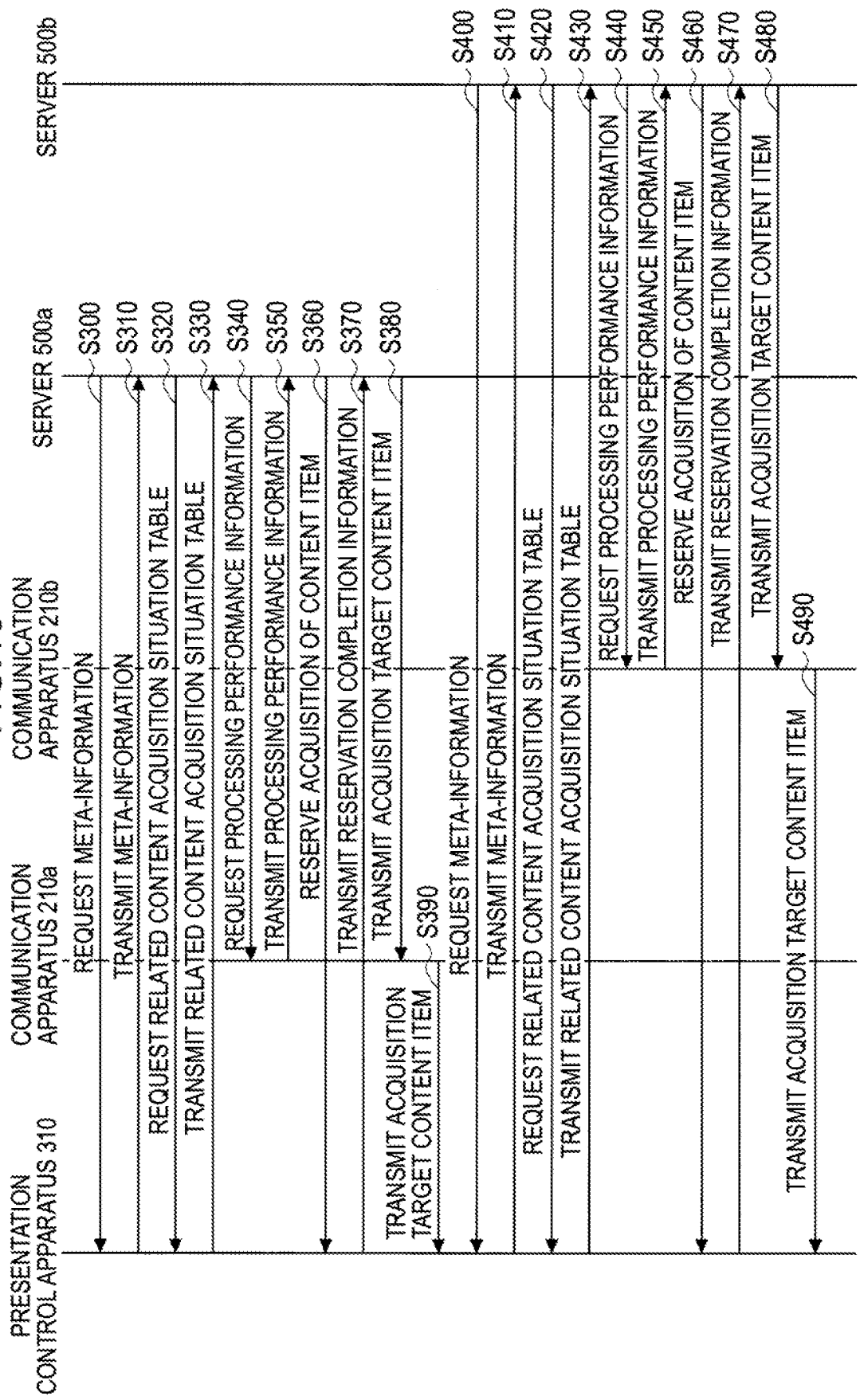

INFORMATION PROCESSING APPARATUS, INFORMATION PROCESSING METHOD, PROGRAM, AND INFORMATION PROCESSING SYSTEM

CROSS-REFERENCE TO RELATED APPLICATION

The present application claims priority from Japanese Patent Application No. JP 2011-173931 filed in the Japanese Patent Office on Aug. 9, 2011, the entire content of which is incorporated herein by reference.

FIELD

The present disclosure relates to an information processing apparatus, an information processing method, a program, and an information processing system.

BACKGROUND

JP-A-2009-225070 discloses a system where a television terminal and a portable terminal communicate with each other.

SUMMARY

However, in the technique disclosed in JP-A-2009-225070, a related content item related to a content item which is being displayed by the television terminal, that is, a reference content item, may not be acquired. Therefore, it is desirable to provide a technique for acquiring such a related content item.

An embodiment of the present disclosure is directed to an information processing apparatus including an acquisition target content determination unit that determines an acquisition target content item which is a target acquired by a content acquisition unit among related content items related to a reference content item, on the basis of processing performance of the content acquisition unit which acquires various content items via a communication network and can communicate with a content presentation control unit which performs a control so as to present the reference content item; and an acquisition processing unit that causes the content acquisition unit to acquire the acquisition target content item.

Another embodiment of the present disclosure is directed to an information processing method including determining an acquisition target content item which is a target acquired by a content acquisition unit among related content items related to a reference content item, on the basis of processing performance of the content acquisition unit which acquires various content items via a communication network and can communicate with a content presentation control unit which performs a control so as to present the reference content item; and causing the content acquisition unit to acquire the acquisition target content item.

Still another embodiment of the present disclosure is directed to a program enabling a computer to realize an acquisition target content determination function of determining an acquisition target content item which is a target acquired by a content acquisition unit among related content items related to a reference content item, on the basis of processing performance of the content acquisition unit which acquires various content items via a communication network and can communicate with a content presentation control unit which performs a control so as to present the reference content item; and an acquisition processing function of causing the content acquisition unit to acquire the acquisition target content item.

Yet another embodiment of the present disclosure is directed to an information processing system including a reference content presentation control apparatus that performs a control so as to present a reference content item; a content acquisition unit which acquires various content items via a communication network and can communicate with the reference content presentation control unit; an acquisition target content determination unit that determines an acquisition target content item which is a target acquired by a content acquisition unit among related content items related to the reference content item, on the basis of processing performance of the content acquisition unit; and a communication apparatus that includes an acquisition processing unit which causes the content acquisition unit to acquire the acquisition target content item.

Still yet another embodiment of the present disclosure is directed to an information processing system including a communication apparatus that can acquire various content items via a communication network; a reference content presentation control unit that communicates with the communication apparatus and performs a control so as to present a reference content item; an acquisition target content determination unit that determines an acquisition target content item which is a target acquired by the communication apparatus among related content items related to the reference content item, on the basis of processing performance of the communication apparatus; and a content presentation control apparatus that includes an acquisition processing unit which causes the communication apparatus to acquire the acquisition target content item.

Further another embodiment of the present disclosure is directed to an information processing system including a communication apparatus that can acquire various content items via a communication network; a presentation control apparatus that communicates with the communication apparatus and performs a control so as to present a reference content item; an acquisition target content determination unit that determines an acquisition target content item which is a target acquired by the communication apparatus among related content items related to the reference content item, on the basis of processing performance of the communication apparatus; and a server that includes an acquisition processing unit which causes the communication apparatus to acquire the acquisition target content item.

According to the embodiments of the present disclosure, the acquisition target content determination unit can determine an acquisition target content item, and the acquisition processing unit can cause the content acquisition unit to acquire the acquisition target content item.

As described above, according to the embodiments of the present disclosure, the acquisition target content determination unit can determine an acquisition target content item, and the acquisition processing unit can cause the content acquisition unit to acquire the acquisition target content item. Here, the acquisition target content item is a kind of related content item. Therefore, according to the embodiments of the present disclosure, it is possible to acquire a related content item.

BRIEF DESCRIPTION OF THE DRAWINGS

FIG. 4 is a diagram illustrating an example of the related content acquisition situation table.

FIG. 13 is a sequence diagram illustrating an example of the process performed by the information processing system.

DETAILED DESCRIPTION

Figure 1:
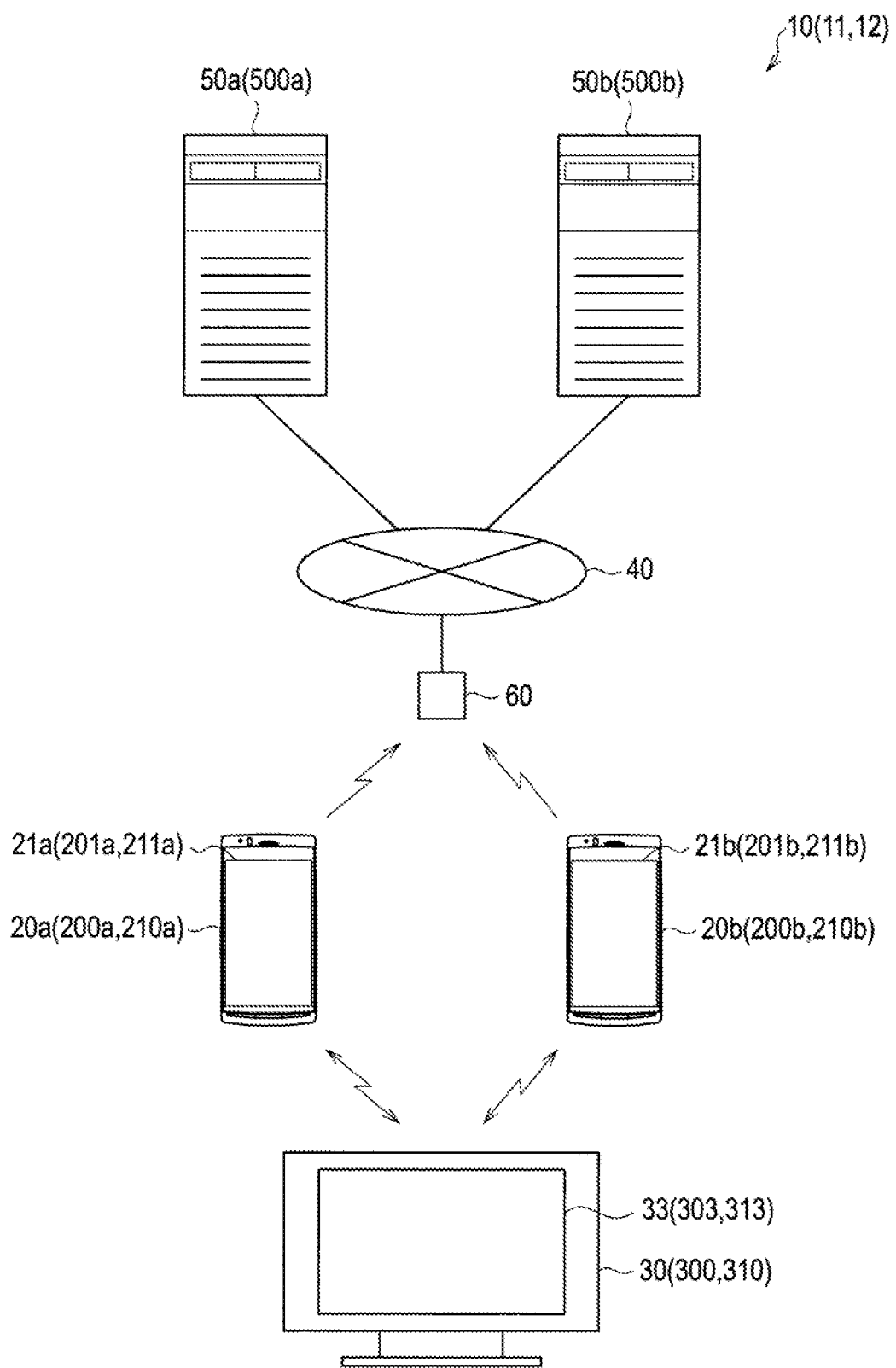
FIG. 1 is a diagram illustrating an information processing system according to each embodiment of the present disclosure.

Embodiments of the present disclosure will be described in detail with reference to the accompanying drawings. In addition, in the present specification and the drawings, constituent elements which have substantially the same functional configuration are given the same reference numerals, and repeated description will be omitted.

In addition, the description will be made in the following order.

1. FIRST EMBODIMENT (an example where the communication apparatus includes an acquisition target content determination unit)
   1-1. OVERALL CONFIGURATION
   1-2. CONFIGURATION OF COMMUNICATION APPARATUS
   1-3. CONFIGURATION OF PRESENTATION CONTROL APPARATUS
   1-4. EXAMPLE OF PROCESS PERFORMED BY INFORMATION PROCESSING SYSTEM 2. SECOND EMBODIMENT (an example where the presentation control apparatus includes an acquisition target content determination unit)
   2-1. OVERALL CONFIGURATION
   2-2. CONFIGURATION OF COMMUNICATION APPARATUS
   2-3. CONFIGURATION OF PRESENTATION CONTROL APPARATUS
   2-4. EXAMPLE OF PROCESS PERFORMED BY INFORMATION PROCESSING SYSTEM 3. THIRD EMBODIMENT (an example where the server includes an acquisition target content determination unit)
   3-1. OVERALL CONFIGURATION
   3-2. CONFIGURATION OF COMMUNICATION APPARATUS
   3-3. CONFIGURATION OF PRESENTATION CONTROL APPARATUS
   3-4. CONFIGURATION OF SERVER
   3-5. EXAMPLE OF PROCESS PERFORMED BY INFORMATION PROCESSING SYSTEM <1. First Embodiment>

[1-1. Overall Configuration]

First, with reference to FIG. 1, an overall configuration of an information processing system 10 according to the first embodiment will be described. The information processing system 10 includes communication apparatuses (information processing apparatuses) 20a and 20b, a presentation control apparatus 30, a communication network 40, servers 50a and 50b, and a relay 60.

The communication apparatuses 20a and 20b are mobile apparatuses which a user can carry and can wirelessly communicate with the presentation control apparatus 30. In addition, the communication apparatuses 20a and 20b can be connected to the communication network 40 via the relay 60 (for example, a wireless LAN router, a base station, or the like). The communication network 40 is connected to the presentation control apparatus 30 and the servers 50a and 50b. Therefore, the communication apparatuses 20a and 20b also can communicate with presentation control apparatus 30 and the servers 50a and 50b via the communication network 40.

In addition, the communication apparatuses 20a and 20b can acquire a related content item related to a content item which is being presented by the presentation control apparatus 30, that is, a reference content item, from the servers 50a and 50b. In addition, the communication apparatuses 20a and 20b may be any apparatus as long as the apparatus can be connected to the communication network 40, and, for example, may be a desktop PC, a notebook PC, a gaming machine, or the like.

The presentation control apparatus 30 presents various content items. In addition, the presentation control apparatus 30 wirelessly communicates with the communication apparatuses 20a and 20b. The presentation control apparatus 30 is connected to the communication network 40 and can communicate with the communication apparatuses 20a and 20b and the servers 50 via the communication network 40.

The servers 50a and 50b provide various web services. The web services may include, for example, a service for providing a content item which explains meanings of various terms, a service for providing a moving image content item, a service for providing an audio content item, a service for providing a blog or a short blog (specifically, the service causes a user to create and view the blog), and the like. In addition, a content item provided by each web service includes meta-information of the content item. The meta-information of the content item is the whole information regarding the content item. For example, if the content item is a moving image content item, the meta-information includes information indicating characters appearing therein, dramatis personae, a director, synopsis, an author, and the like. In addition, if the content item is an audio content item, the meta-information includes information indicating an artist, a song title, and the like.

The communication apparatuses 20a and 20b (specifically, content acquisition units 23a and 23b included in the communication apparatuses 20a and 20b) support several web services among the web services. Here, the expression "support web services" means that content items can be acquired from the web services. Hereinafter, a web service supported by the content acquisition unit 23a (or content acquisition units 203a and 213a described later) is also referred to as a "first supportable service". In addition, a web service supported by the content acquisition unit 23b (or content acquisition units 203b and 213b described later) is also referred to as a "second supportable service".

In addition, in FIG. 1, the information processing system 10 includes the two communication apparatuses, the presentation control apparatus, and the two servers; however, the number of respective constituent elements is not limited thereto.

[1-2. Configuration of Communication Apparatus]

Figure 2:
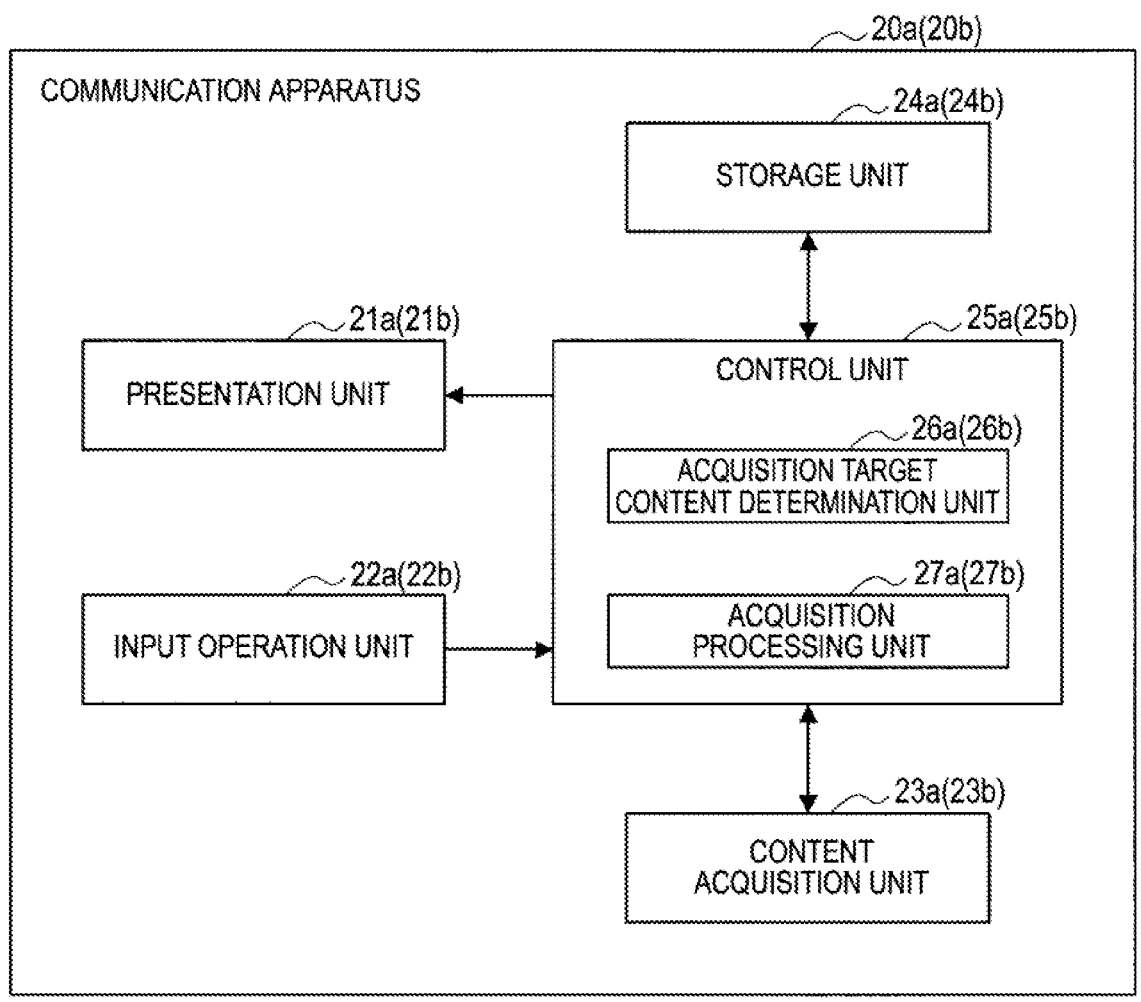
FIG. 2 is a block diagram illustrating a communication apparatus according to the same embodiment.

Next, a configuration of the communication apparatuses 20a and 20b will be described with reference to FIGS. 1 and 2. As shown in FIG. 2, the communication apparatus 20a includes a presentation unit 21a, an input operation unit 22a, the content acquisition unit 23a, a storage unit 24a, and a control unit 25a. In other words, the communication apparatus 20a has hardware structures such as a CPU, a ROM, a RAM, a touch panel, a display, and a communication antenna, and the above-described constituent elements are realized by the hardware structures.

The presentation unit 21a is a so-called display, displays various image content items, and outputs various audio content items. The input operation unit 22a is a so-called touch panel, and outputs operation information corresponding to an input operation of a user to the control unit 25a. For example, the user inputs (designates) a content item which is desired to be presented to the presentation control apparatus 30.

The content acquisition unit 23a can acquire various content items and communicate with the presentation control apparatus 30 via the communication network 40. In other words, the content acquisition unit 23a can be connected to the communication network 40 via the relay 60. In addition, the content acquisition unit 23a supports one or a plurality of web services. The content acquisition unit 23a is connected to the server 50 providing a first supportable service via the communication network 40 and acquires various content items from the first supportable service. In addition, the content acquisition unit 23a wirelessly communicates with the presentation control apparatus 30 and thereby causes the presentation control apparatus 30 to present various content items.

The storage unit 24a stores a variety of information which is necessary for the communication apparatus 20a to perform various processes, for example, image information, audio information, programs, and the like. In addition, the storage unit 24a stores a processing speed of the content acquisition unit 23a, a communication rate of the content acquisition unit 23a, and the name of the first supportable service. Here, the processing speed of the content acquisition unit 23a is, for example, the number of commands which can be executed per unit time by the CPU forming the communication apparatus 20a and is expressed by a unit such as MIPS. In addition, the communication rate of the content acquisition unit 23a is, for example, a rate of wireless communication performed between the content acquisition unit 23a and the relay 60, more specifically, a communication rate when information is wirelessly transmitted from the relay 60 to the content acquisition unit 23a, and is expressed by a unit such as bps. The programs cause the communication apparatus 20a to realize the respective functional blocks, particularly, an acquisition target content determination unit 26a and an acquisition processing unit 27a.

The control unit 25a controls the respective constituent elements of the communication apparatus 20a and also functions as the acquisition target content determination unit 26a and the acquisition processing unit 27a. The acquisition target content determination unit 26a determines an acquisition target content item which is a target acquired by the content acquisition unit 23a among related content items on the basis of processing performance of the content acquisition unit 23a. The acquisition processing unit 27a performs a process for causing the content acquisition unit 23a to acquire the acquisition target content item. A detailed process thereof will be described later.

The communication apparatus 20b includes a presentation unit 21b, an input operation unit 22b, a content acquisition unit 23b, a storage unit 24b, and a control unit 25b. The control unit 25b functions as an acquisition target content determination unit 26b and an acquisition processing unit 27b. Functions of the constituent elements are the same as those in the communication apparatus 20a.

[1-3. Configuration of Preservation Control Apparatus]

Figure 3:
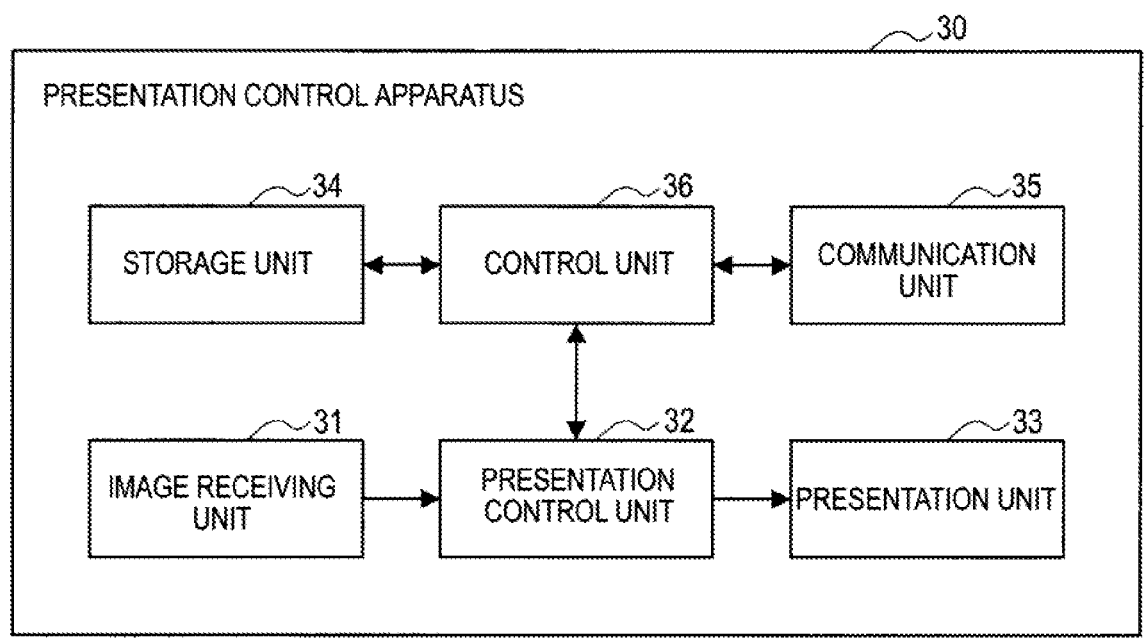
FIG. 3 is a block diagram illustrating a presentation control apparatus according to the same embodiment.

Next, a configuration of the presentation control apparatus 30 will be described with reference to FIGS. 3 and 4. The presentation control apparatus 30 includes an image receiving unit 31, a presentation control unit 32, a presentation unit 33, a storage unit 34, a communication unit 35, and a control unit 36. In other words, the presentation control apparatus 30 has hardware structures such as a CPU, a ROM, a RAM, a hard disk, a display, and a communication antenna, and the above-described constituent elements are realized by the hardware structures.

The image receiving unit 31 receives a broadcast wave including various image content items and audio content items, and extracts a desired content item, that is, a reference content item, from the received broadcast wave. In addition, a content item included in the broadcast wave includes meta-information of the content item.

The image receiving unit 31 outputs the extracted reference content item to the presentation control unit 32. The presentation control unit 32 performs various preprocesses (for example, an image process such as a gamma process) or the like for the reference content item sent from the image receiving unit 31. The presentation control unit 32 outputs the reference content item having undergone the preprocesses to the presentation unit 33. The presentation unit 33 is a so-called display, and presents the reference content item. In other words, the presentation unit 33 displays image content items included in the reference content item and outputs audio content items included in the reference content item. In addition, the presentation control unit 32 outputs meta-information included in the reference content item to the control unit 36. The control unit 36 stores the meta-information in the storage unit 34.

The storage unit 34 stores a variety of information which is necessary for the presentation control apparatus 30 to perform various processes, for example, image information, audio information, programs, and the like. In addition, the storage unit 34 stores a related content acquisition situation table shown in FIG. 4. The programs cause the presentation control apparatus 30 to perform the above-described functional blocks.

The related content acquisition situation table records a web service name, meta-information of a reference content item, and an acquisition state of a related content item so as to be correlated with each other. The control unit 36 stores meta-information which is given to a reference content item in advance in the related content acquisition situation table. However, the control unit 36 may extract a variety of meta-information from the reference content item by performing various analysis processes (face recognition, morphological analysis, and the like) for the reference content item, and store the extracted meta-information in the related content acquisition situation table. The meta-information may become a keyword when the content acquisition unit 23 searches for a related content item.

The acquisition state of the related content item is one of "non-acquired", "reserved", and "acquired". The "non-acquired" state indicates that a related content item is not yet acquired. The "reserved" state indicates that an attempt is being made to acquire a related content item. The "acquired" state indicates a state where a related content item has been acquired. The related content acquisition situation table is generated by the control unit 36.

The communication unit 35 wirelessly communicates with the communication apparatuses 20a and 20b and communicates with the communication apparatuses 20a and 20b or the server 50 via the communication network 40. The control unit 36 controls the respective constituent elements of the presentation control apparatus 30.

[1-4. Example of Process Performed by Information Processing System]

Figure 5:
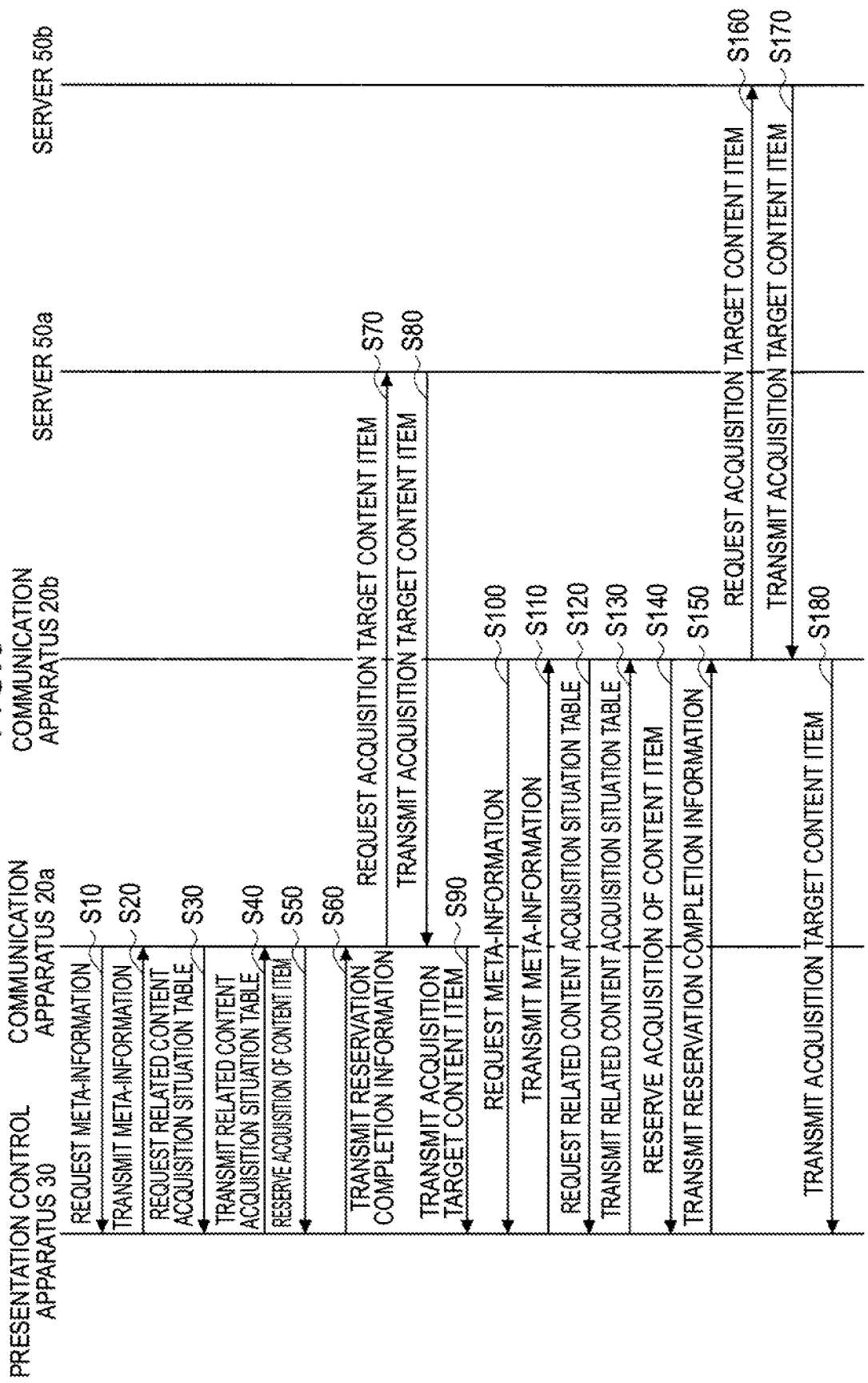
FIG. 5 is a sequence diagram illustrating an example of the process performed by the information processing system.

Next, an example of the process performed by the information processing system 10 will be described with reference to a sequence diagram shown in FIG. 5. In this example, the communication apparatus 20a supports a web service A, and the communication apparatus 20b supports web services B and C. The web service A is a service for providing a content item which explains meanings of various terms. The web service B is a service for providing a moving image content item. The web service C is a service for providing a blog or a short blog.

In addition, the server 50a provides the web service A, and the server 50b provides the web services B and C. Further, it is assumed that, unless particularly described, the communication apparatuses 20a and 20b wirelessly communicate with the presentation control apparatus 30.

First, a user of the communication apparatus 20a causes the presentation control apparatus 30 to present a desired reference content item using the communication apparatus 20a. Specifically, the user inputs operation information indicating the reference content item (for example, operation information indicating the channel name) to the input operation unit 22a. The input operation unit 22a outputs the input operation information to the control unit 25a. The control unit 25a outputs the operation information to the content acquisition unit 23a. The content acquisition unit 23a transmits the operation information to the presentation control apparatus 30. The communication unit 35 of the presentation control apparatus 30 receives the operation information which is output to the control unit 36. The control unit 36 outputs the operation information to the presentation control unit 32. The presentation control unit 32 causes the image receiving unit 31 to acquire the reference content item indicated by the operation information. The image receiving unit 31 outputs the acquired reference content item to the presentation control unit 32. The presentation control unit 32 performs preprocesses for the reference content item and causes the presentation unit 33 to present the reference content item. In addition, the user may cause the presentation control apparatus 30 to present the reference content item using the communication apparatus 20b.

On the other hand, the presentation control unit 32 outputs meta-information included in the reference content item to the control unit 36. The control unit 36 stores the meta-information in the storage unit 34. In addition, the control unit 36 generates the related content acquisition situation table shown in FIG. 4. In each row of the related content acquisition situation table, the web service name, meta-information of a reference content item, and an acquisition state of a reference image are recorded. In addition, at this time, the acquisition states of a related content item are all "non-acquired". In addition, the web service name may be stored in the storage unit 34 in advance. The related content acquisition situation table generated by the control unit 36 includes at least rows regarding the "web service A" to the "web service C".

Next, in step S10, the control unit 25a of the communication apparatus 20a generates meta-information request information indicating a request for the meta-information of the reference content item and outputs the meta-information request information to the content acquisition unit 23a. The content acquisition unit 23a transmits the meta-information request information to the presentation control apparatus 30.

In step S20, the communication unit 35 of the presentation control apparatus 30 receives the meta-information request information which is output to the control unit 36. The control unit 36 acquires the meta-information from the storage unit 34 and outputs the meta-information to the communication unit 35. The communication unit 35 transmits the meta-information to the communication apparatus 20a. The content acquisition unit 23a of the communication apparatus 20a receives the meta-information which is output to the control unit 25a, and the control unit 25a stores the meta-information in the storage unit 24a.

Thereafter, in step S30, the control unit 25a generates related content acquisition situation table request information indicating a request for the related content acquisition situation table, so as to be output to the content acquisition unit 23a. The content acquisition unit 23a transmits the related content acquisition situation table request information to the presentation control apparatus 30.

In step S40, the communication unit 35 of the presentation control apparatus 30 receives the related content acquisition situation table request information which is output to the control unit 36. The control unit 36 acquires the related content acquisition situation table from the storage unit 34 which is output to the communication unit 35. The communication unit 35 transmits the related content acquisition situation table to the communication apparatus 20a.

In step S50, the content acquisition unit 23a of the communication apparatus 20a outputs the related content acquisition situation table to the acquisition target content determination unit 26a. The acquisition target content determination unit 26a performs the following related content acquisition reservation process for each first supportable service. In other words, the acquisition target content determination unit 26a determines whether or not a related content acquisition state of the first supportable service is "non-acquired" on the basis of the related content acquisition situation table.

In addition, if it is determined that the related content acquisition state is "non-acquired", the acquisition target content determination unit 26a changes the related content acquisition state to "reserved". Thereby, the acquisition target content determination unit 26a reserves acquisition of the related content item. In this example, since the first supportable service is the "web service A", and a related content acquisition state of the "web service A" is "non-acquired", the acquisition target content determination unit 26a changes the related content acquisition state of the "web service A" to "reserved".

In addition, the acquisition target content determination unit 26a finishes the related content acquisition reservation process if the related content acquisition state of the first supportable service is "reserved". In addition, if a row corresponding to a supportable service is absent in the related content acquisition situation table, the acquisition target content determination unit 26a generates a new row corresponding to the supportable service and adds the row in the related content acquisition situation table. A related content acquisition state of the added row is "reserved". Hereinafter, a supportable service where a related content item is reserved to be acquired by the content acquisition unit 23a (or the content acquisition units 203a and 213a described later) is also referred to as a "first reserved web service".

The acquisition target content determination unit 26a performs the related content acquisition reservation process for all the first supportable services, thereby updating the related content acquisition situation table. The acquisition target content determination unit 26*a* outputs the updated related content acquisition situation table to the content acquisition unit 23*a*, and the content acquisition unit 23*a* transmits the related content acquisition situation table to the presentation control apparatus 30.

In step S60, the communication unit 35 of the presentation control apparatus 30 receives the related content acquisition situation table, that is, the updated related content acquisition situation table which is output to the control unit 36. The control unit 36 compares the related content acquisition situation tables before and after being updated, thereby specifying the first reserved web service. The control unit 36 stores the updated related content acquisition situation table in the storage unit 34. In addition, the control unit 36 generates reservation completion information indicating that reservation of the related content acquisition is completed, and outputs the reservation completion information to the communication unit 35. The communication unit 35 transmits the reservation completion information to the communication apparatus 20*a*. In addition, if there is no first reserved web service, the communication unit 35 does not transmit the reservation completion information, and the flow proceeds to step S100.

In step S70, the content acquisition unit 23*a* of the communication apparatus 20*a* receives the reservation completion information which is output to the acquisition target content determination unit 26*a*. The acquisition target content determination unit 26*a* determines an acquisition target content item which is a target acquired by the content acquisition unit 23*a* among related content items related to the reference content item, on the basis of the processing speed, communication rate and the first reserved web service of the content acquisition unit 23*a*.

Specifically, the acquisition target content determination unit 26*a* determines the number of allowable commands where a processing time by the content acquisition unit 23*a* is a predetermined allowable processing time on the basis of the processing speed of the content acquisition unit 23*a*. Here, the number of allowable commands can be obtained by multiplying the processing speed of the content acquisition unit 23*a* by the allowable processing time. In addition, the acquisition target content determination unit 26*a* determines an allowable information amount where a communication time by the content acquisition unit 23*a* is a predetermined allowable communication time on the basis of the communication rate of the content acquisition unit 23*a*. Here, the allowable information amount can be obtained by multiplying the communication rate of the content acquisition unit 23*a* by the allowable communication time.

Further, the acquisition target content determination unit 26*a* includes a relevance condition that a content item includes meta-information of the reference content item, in search conditions. In addition, the acquisition target content determination unit 26*a* includes processing performance conditions that a content item has the number of commands equal to or less than the number of allowable commands, the content item has an information amount equal to or less than the allowable information amount, and the content item is provided by the first reserved web service, in the search conditions. The acquisition target content determination unit 26*a* determines a content item satisfying the search conditions as an acquisition target content item. In this example, the first reserved web service is the web service A. Therefore, the acquisition target content item is a content item which includes the meta-information of the reference content item, has the number of commands equal to or less than the number of allowable commands, has an information amount equal to or less than the allowable information amount, and is provided by the web service A.

In addition, although the acquisition target content determination unit 26*a* sets search conditions in consideration of all of the processing speed, the communication rate and the first reserved web service of the content acquisition unit 23*a*, the search conditions may be set in consideration of at least one of them.

In addition, the acquisition target content determination unit 26*a* may set search conditions on the basis of an installation position of the presentation control apparatus 30 (that is, an installation position of the presentation control unit 32). For example, the acquisition target content determination unit 26*a* may include an installation position condition that a content item is executed a predetermined number of times or more in an area within the diameter 10 km with respect to the presentation control apparatus 30, in search conditions.

In addition, the acquisition target content determination unit 26*a* may set search conditions on the basis of a presentation time point when the presentation control apparatus 30 (that is, the presentation control unit 32) presents a reference content item. For example, the acquisition target content determination unit 26*a* may include a presentation time point condition that a content item is executed a predetermined number of times or more in a time zone including a presentation time point, in search conditions. Specifically, the acquisition target content determination unit 26*a* may include a condition that, if the presentation time point is in the forenoon, a content item is executed a predetermined number of times or more in the forenoon, in search conditions. Similarly, the acquisition target content determination unit 26*a* may include a condition that, if the presentation time point is in the afternoon, a content item is executed a predetermined number of times or more in the afternoon, in search conditions.

In addition, the acquisition target content determination unit 26*a* may set search conditions on the basis of the weather at an installation position of the presentation control apparatus 30 and a presentation time point. For example, the acquisition target content determination unit 26*a* may include a weather condition that a content item is executed a predetermined number of times or more under the installation position and the presentation time point, in search conditions.

In addition, the acquisition target content determination unit 26*a* may set search conditions on the basis of characteristics of the presentation control apparatus 30. The characteristics of the presentation control apparatus 30 may include, for example, characteristics or the like of the presentation control unit 32. The characteristics of the presentation control unit 32 are, specifically, a processing speed, a communication rate, and the like of the presentation control unit 32. Here, the processing speed of the presentation control unit 32 is, for example, the number of commands which the CPU forming the presentation control apparatus 30 can execute per unit time, and is expressed by a unit such as MIPS. In addition, the presentation control unit 32 performs wireless communication with the communication apparatuses 20*a* and 20*b* via the control unit 36 and the communication unit 35. Therefore, the communication rate of the presentation control unit 32 is a rate of wireless communication performed between, for example, the communication unit 35 and the communication apparatuses 20*a* and 20*b*, more specifically, a communication rate when information is wirelessly transmitted to the communication unit 35 from the communication apparatuses 20*a* and 20*b*, and is expressed by a unit such as bps.

Therefore, the acquisition target content determination unit 26a may include a characteristic condition that a processing time of a content item by the presentation control unit 32 is within a predetermined allowable processing time, in search conditions. In addition, the acquisition target content determination unit 26a may include a condition that a communication time of a content item by the presentation control unit 32 is within a predetermined allowable communication time, in search conditions.

The acquisition target content determination unit 26a may set search conditions on the basis of specifications of the presentation control apparatus 30. The specifications of the presentation control apparatus 30 may include, for example, a resolution of the presentation unit 33. Thus, the acquisition target content determination unit 26a may include a specification condition that a resolution of the content item is equal to or less than a resolution of the presentation unit 33, in search conditions.

In addition, the acquisition target content determination unit 26a may set search conditions on the basis of characteristics of a user using the presentation control apparatus 30. The characteristics of the user may include behavioral history, preference, and the like of the user. In other words, the acquisition target content determination unit 26a may include, for example, a user characteristic condition that a content item is provided from a web service which was used by the user a predetermined number of times or more in a predetermined time period in the past, in search conditions.

In addition, the acquisition target content determination unit 26a may set search conditions on the basis of rating of a web service. For example, the acquisition target content determination unit 26a may include a rating condition that a content item is provided from a web service of which the rating is equal to or more than a predetermined value, in search conditions. In addition, the rating of the web service is a parameter indicating evaluation from each user for the web service. For example, the larger a value of the rating is, the higher the evaluation of users for a web service is.

The acquisition processing unit 27a performs a process for causing the content acquisition unit 23a to acquire an acquisition target content item. Specifically, the acquisition processing unit 27a outputs search condition information regarding search conditions to the content acquisition unit 23a. The content acquisition unit 23a requests the server 50a which provides the first supportable service to transmit the acquisition target content item. Specifically, the content acquisition unit 23a transmits the search condition information to the server 50a.

In step S80, the server 50a searches for a content item satisfying the search conditions, that is, the acquisition target content item from content items stored therein, on the basis of the search condition information. The server 50a transmits the searched acquisition target content item to the communication apparatus 20a. If a plurality of acquisition target content items are present, the server 50a may transmit all the acquisition target content items to the communication apparatus 20a, or may transmit any one (for example, an acquisition target content item having the largest information amount) of the acquisition target content items. This is also same for a process performed by the server 50b, the second embodiment, and the third embodiment, described later.

In step S90, the content acquisition unit 23a receives the acquisition target content item which is output to the presentation control apparatus 30. On the other hand, the content acquisition unit 23a outputs the received acquisition target content item to the control unit 25a. The control unit 25a stores the acquisition target content item in the storage unit 24a. In addition, the control unit 25a may cause the presentation unit 21a to present the acquisition target content item. Further, the control unit 25a may share the acquisition target content item stored in the storage unit 24a with the other communication apparatus 20b. In other words, the control unit 25a may provide the acquisition target content item to the communication apparatus 20b in response to a request from the communication apparatus 20b. In addition, in a case where the content acquisition unit 23a acquires a plurality of acquisition target content items, the control unit 25a may cause a user to select which content item is presented by the presentation control apparatus 30 among the acquisition target content items. In this case, the control unit 25a causes the presentation unit 21a to display a list of the acquisition target content items. The user can select a desired acquisition target content item by referring to the list. This is also same for a process performed by the communication apparatus 20b, the second embodiment, and the third embodiment, described later.

The communication unit 35 of the presentation control apparatus 30 receives the acquisition target content item which is output to the control unit 36. The control unit 36 stores the acquisition target content item in the storage unit 34 and outputs the acquisition target content item to the presentation control unit 32. The control unit 36 updates the related content acquisition situation table on the basis of the acquisition target content item. In other words, the control unit 36 updates the related content acquisition situation state of the row corresponding to the acquisition target content item to "acquired". The presentation control unit 32 causes the presentation unit 33 to present the acquisition target content item or meta-information included in the acquisition target content item. In addition, the acquisition target content item stored in the storage unit 34 may be used by other applications. For example, the acquisition target content item may be recorded on any recording medium (for example, CD-R or CD-RW). Further, the acquisition target content item may be meta-information of a reference content item.

In steps S100 to S180, the information processing system 10 performs almost the same processes as in steps S10 to S90. In other words, in step S100, the control unit 25b of the communication apparatus 20b generates meta-information request information which is output to the content acquisition unit 23b. The content acquisition unit 23b transmits the meta-information request information to the presentation control apparatus 30.

In step S110, the communication unit 35 of the presentation control apparatus 30 receives the meta-information request information which is output to the control unit 36. The control unit 36 acquires the meta-information from the storage unit 34 and outputs the meta-information to the communication unit 35. The communication unit 35 transmits the meta-information to the communication apparatus 20b. The content acquisition unit 23b of the communication apparatus 20b receives the meta-information which is output to the control unit 25b, and the control unit 25b stores the meta-information in the storage unit 24b.

Thereafter, in step S120, the control unit 25b generates related content acquisition situation table request information which is output to the content acquisition unit 23b. The content acquisition unit 23b transmits the related content acquisition situation table request information to the presentation control apparatus 30.

In step S130, the communication unit 35 of the presentation control apparatus 30 receives the related content acquisition situation table request information which is output to the control unit 36. The control unit 36 acquires the related content acquisition situation table from the storage unit 34 which is output to the communication unit 35. The communication unit 35 transmits the related content acquisition situation table to the communication apparatus 20b.

In step S140, the content acquisition unit 23b of the communication apparatus 20b outputs the related content acquisition situation table to the acquisition target content determination unit 26b. The acquisition target content determination unit 26b performs the above-described related content acquisition reservation process for each second supportable service. In this example, the second supportable services are the "web service B" and the "web service C", and related content acquisition states of the "web service B" and the "web service C" are "non-acquired". Therefore, the acquisition target content determination unit 26b changes the related content acquisition states of the "web service B" and the "web service C" to "reserved". Thereby, the acquisition target content determination unit 26b can reserve acquisition of the related content item on the basis of acquisition situations of the related content items by the other communication apparatus 20a. Hereinafter, a supportable service where a related content item is reserved to be acquired by the content acquisition unit 23b (or the content acquisition units 203b and 213b described later) is also referred to as a "second reserved web service".

The acquisition target content determination unit 26b performs the related content acquisition reservation process for all the second supportable services, thereby updating the related content acquisition situation table. The acquisition target content determination unit 26b outputs the updated related content acquisition situation table to the content acquisition unit 23b, and the content acquisition unit 23b transmits the related content acquisition situation table to the presentation control apparatus 30.

In step S150, the communication unit 35 of the presentation control apparatus 30 receives the related content acquisition situation table which is output to the control unit 36. The control unit 36 compares the related content acquisition situation tables before and after being updated, thereby specifying the second reserved web service. The control unit 36 stores the updated related content acquisition situation table in the storage unit 34. In addition, the control unit 36 generates reservation completion information indicating that reservation of the related content acquisition is completed, and outputs the reservation completion information to the communication unit 35. The communication unit 35 transmits the reservation completion information to the communication apparatus 20b. In addition, if there is no second reserved web service, the communication unit 35 does not transmit the reservation completion information, and finishes the processes shown in FIG. 5.

In step S160, the content acquisition unit 23b of the communication apparatus 20b receives the reservation completion information which is output to the acquisition target content determination unit 26b. The acquisition target content determination unit 26b determines an acquisition target content item on the basis of the processing speed, communication rate and the second reserved web service of the content acquisition unit 23b. A detailed determination method is the same as in step S70. In addition, in this example, since the second reserved services are the web service B and the web service C, the acquisition target content determination unit 26b determines content items provided by the web services B and C as acquisition target content items.

The acquisition processing unit 27b performs a process for causing the content acquisition unit 23b to acquire an acquisition target content item. Specifically, the acquisition processing unit 27b outputs search condition information regarding search conditions to the content acquisition unit 23b. The content acquisition unit 23b requests the server 50b which provides the second supportable services to transmit the acquisition target content items. Specifically, the content acquisition unit 23b transmits the search condition information to the server 50b.

In step S170, the server 50b searches for content items satisfying the search conditions, that is, the acquisition target content items from content items stored therein, on the basis of the search condition information. The server 50b transmits the searched acquisition target content items to the communication apparatus 20b.

In step S180, the content acquisition unit 23b receives the acquisition target content items which are output to the presentation control apparatus 30. On the other hand, the content acquisition unit 23b outputs the received acquisition target content items to the control unit 25b. The control unit 25b stores the acquisition target content items in the storage unit 24b. In addition, the control unit 25b may cause the presentation unit 21b to present the acquisition target content item. Further, the control unit 25b may share the acquisition target content item stored in the storage unit 24b with the other communication apparatus 20a. In other words, the control unit 25b may provide the acquisition target content items to the communication apparatus 20a in response to a request from the communication apparatus 20a.

The communication unit 35 of the presentation control apparatus 30 receives the acquisition target content items which are output to the control unit 36. The control unit 36 stores the acquisition target content items in the storage unit 34 and outputs the acquisition target content items to the presentation control unit 32. The control unit 36 updates the related content acquisition situation table on the basis of the acquisition target content items. In other words, the control unit 36 updates the related content acquisition situation states of the rows corresponding to the acquisition target content items to "acquired". The presentation control unit 32 causes the presentation unit 33 to present the acquisition target content items or meta-information included in the acquisition target content items. In addition, the acquisition target content items stored in the storage unit 34 may be used by other applications.

Figure 6:
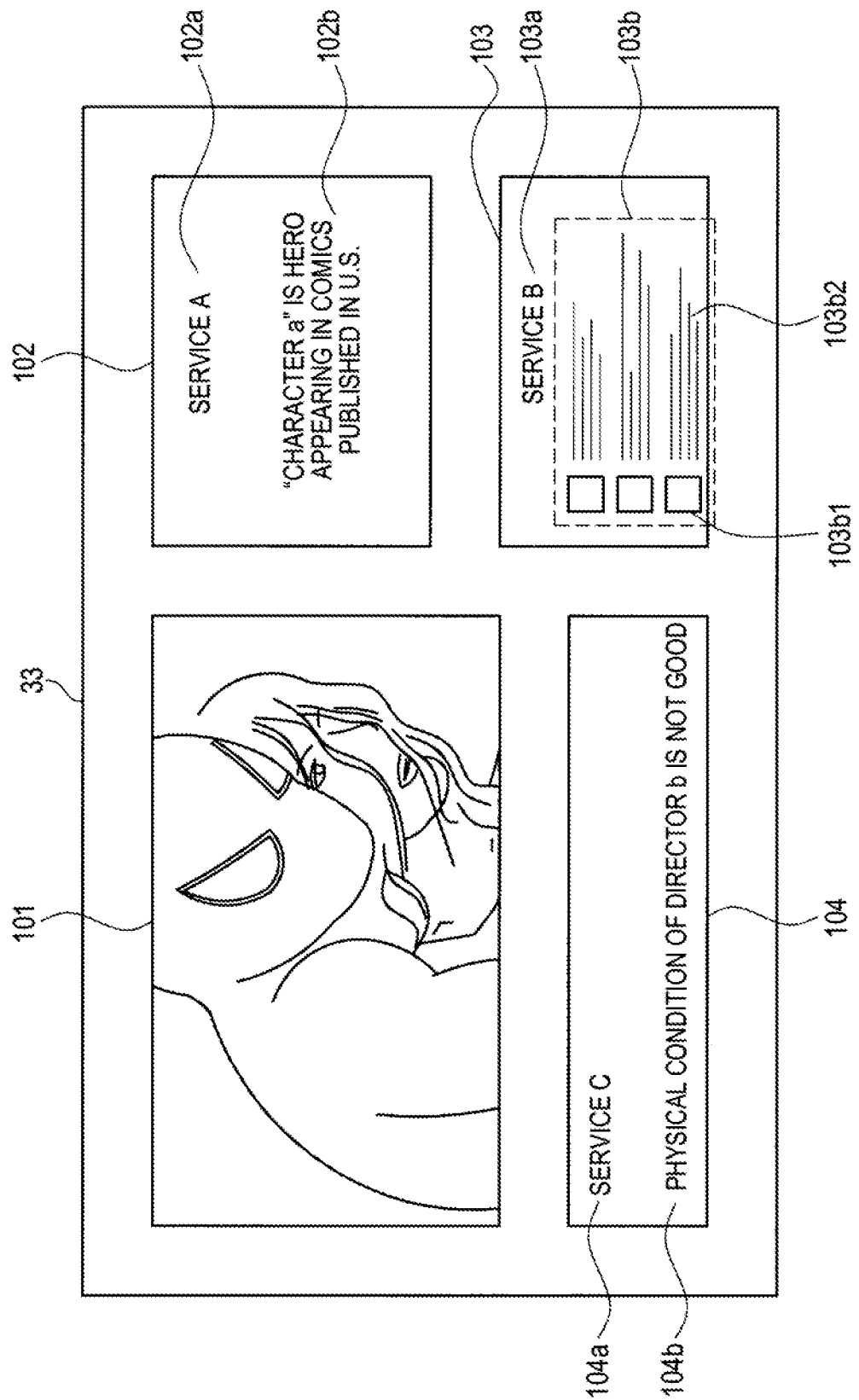
FIG. 6 is a diagram illustrating an example of the image displayed by the presentation control apparatus.

FIG. 6 shows an example of each content item displayed by the presentation unit 33. The display screen of the presentation unit 33 is partitioned into a reference content display region 101, and related content display regions 102 to 104. The reference content display region 101 displays the reference content item. The related content display regions 102 to 104 are partitioned into web service name display regions 102a to 104a and related content display regions 102b to 104b.

The web service name display region 102a displays character information indicating the web service A. The related content display region 102b displays a related content item provided by the web service A.

The web service name display region 103a displays character information indicating the web service B. The related content display region 103b displays meta-information of a related content item, instead of the related content item provided by the web service B. In this display example, the meta-information is formed by a thumbnail 103b1 of the moving image content item and an introduction 130b2 of the moving image content item.

The web service name display region 104a displays character information indicating the web service C. The related content display region 104b displays the related content item provided by the web service C. Therefore, the presentation unit 33 can display the reference content item and the related content items in parallel.

As above, according to the information processing system 10 related to the first embodiment, the communication apparatuses 20a and 20b can acquire the related content items related to the reference content item. In addition, the presentation control apparatus 30 may not allocate sufficient storage capacity of the storage unit 34 in acquisition of various image content items via the communication network. On the other hand, the communication apparatuses 20a and 20b can allocate most of the storage capacity of the storage units 24a and 24b in acquisition of various image content items via the communication network. Therefore, it is preferable from the viewpoint of a processing speed for the communication apparatuses 20a and 20b to acquire related content items rather than for the presentation control apparatus 30 itself to acquire the related content items.

In addition, the respective communication apparatuses 20a and 20b acquire related content items on the basis of processing capacity thereof, and thus a related content item can be efficiently acquired. Specifically, the respective communication apparatuses 20a and 20b acquire a related content item on the basis of at least one of processing speeds of the content acquisition units 23a and 23b, communication rates of the content acquisition units 23a and 23b, and supportable services. Therefore, the communication apparatuses 20a and 20b can exclude a content item exceeding an allowable processing time and an allowable communication time from acquisition targets.

Further, the respective communication apparatuses 20a and 20b acquire a related content item in cooperation with the presentation control apparatus 30 or the other communication apparatuses 20a and 20b, and thus a related content item can be efficiently collected. Specifically, the respective communication apparatuses 20a and 20b can acquire a related content item on the basis of acquisition situations of the related content item by the other communication apparatuses 20a and 20b. Therefore, the respective communication apparatuses 20a and 20b can prevent the same related content item from being acquired in an overlapping manner.

Further, the respective communication apparatuses 20a and 20b acquire a related content item on the basis of the related content acquisition situation table, and thus a related content item can be efficiently collected. In other words, the respective communication apparatuses 20a and 20b can easily grasp acquisition situations of a related content item by the other communication apparatuses 20a and 20b on the basis of the related content acquisition situation table.

In addition, the respective communication apparatuses 20a and 20b acquire a related content item on the basis of at least one of an installation position of the presentation control apparatus 30, a presentation time point when the presentation control apparatus 30 presents a reference content item, the weather at the installation position of the presentation control apparatus 30 and the presentation time point, characteristics of the presentation control apparatus 30, characteristics of a user using the presentation control apparatus 30, and rating of a web service. Therefore, the respective communication apparatuses 20a and 20b can search for a related content item even more accurately.

The respective communication apparatuses 20a and 20b can acquire a related content item on the basis of meta-information of a reference content item. Therefore, the respective communication apparatuses 20a and 20b can easily and promptly search for a related content item.

<2. Second Embodiment>
[2-1. Overall Configuration]

Next, the second embodiment will be described. First, with reference to FIG. 1, an overall configuration of an information processing system 11 according to the second embodiment will be described. The information processing system 11 includes communication apparatuses 200a and 200b, a presentation control apparatus (information processing apparatus) 300, a communication network 40, servers 50a and 50b, and a relay 60. As such, in the second embodiment, the configurations of the communication apparatuses and the presentation control apparatus are different from those in the first embodiment. Therefore, the second embodiment will be described mainly based on these differences.

[2-2. Configuration of Communication Apparatus]

Figure 7:
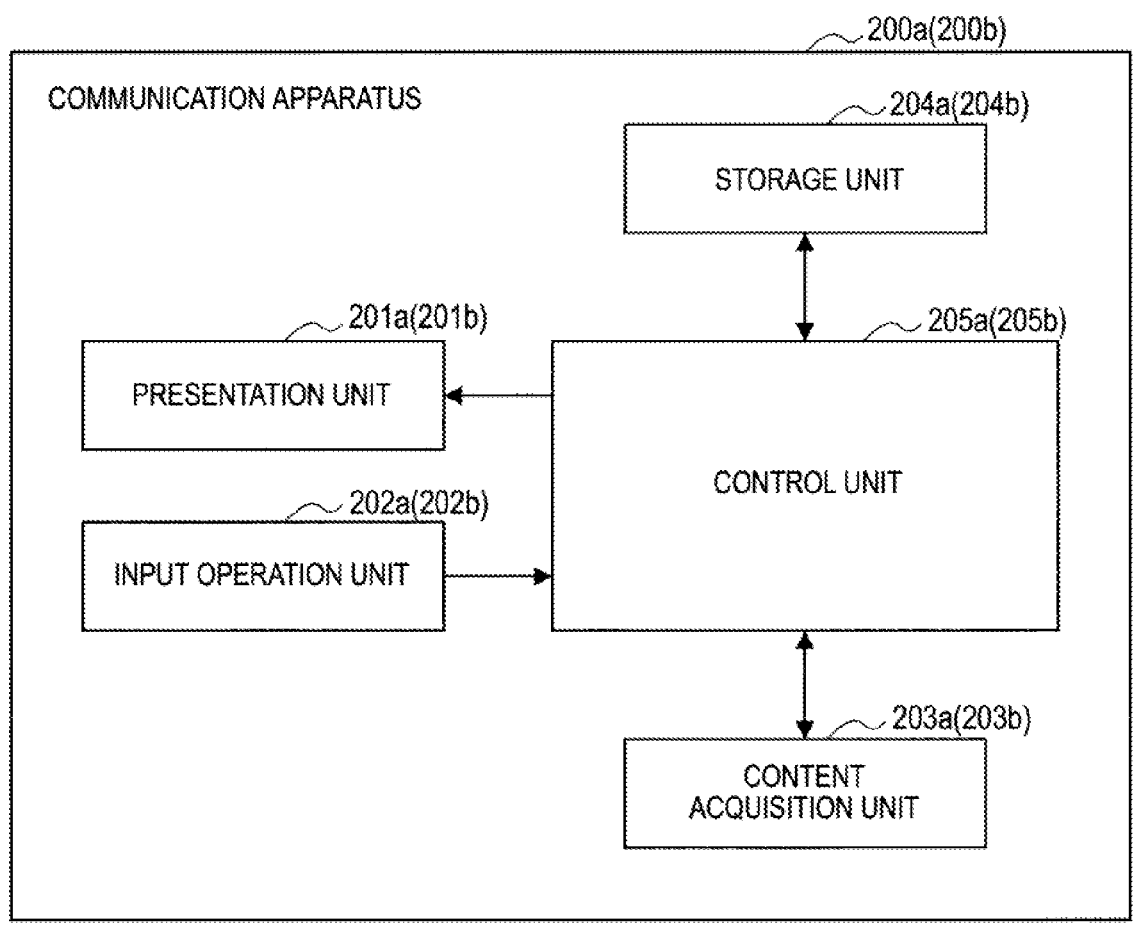
FIG. 7 is a block diagram illustrating a communication apparatus according to a second embodiment.

Next, with reference to FIG. 7, a configuration of the communication apparatus 200a according to the second embodiment will be described. As shown in FIG. 7, the communication apparatus 200a includes a presentation unit 201a, an input operation unit 202a, a content acquisition unit 203a, a storage unit 204a, and a control unit 205a. In other words, the communication apparatus 200a has hardware structures such as a CPU, a ROM, a RAM, a touch panel, a display, and a communication antenna, and the above-described constituent elements are realized by the hardware structures.

The presentation unit 201a, the input operation unit 202a, the content acquisition unit 203a, and the storage unit 204a are the same as the presentation unit 21a, the input operation unit 22a, the content acquisition unit 23a, and the storage unit 24a according to the first embodiment. The control unit 205a controls the respective constituent elements of the communication apparatus 200a. In addition, the control unit 205a generates processing performance information regarding a processing speed, a communication rate, and supportable services of the content acquisition unit 203a, so as to be output to the content acquisition unit 203a. The content acquisition unit 203a transmits the processing performance information to the presentation control apparatus 300.

The communication apparatus 200b includes a presentation unit 201b, an input operation unit 202b, a content acquisition unit 203b, a storage unit 204b, and a control unit 205b. Functions of the constituent elements are the same as those in the communication apparatus 200a.

[2-3. Configuration of Presentation Control Apparatus]

Figure 8:
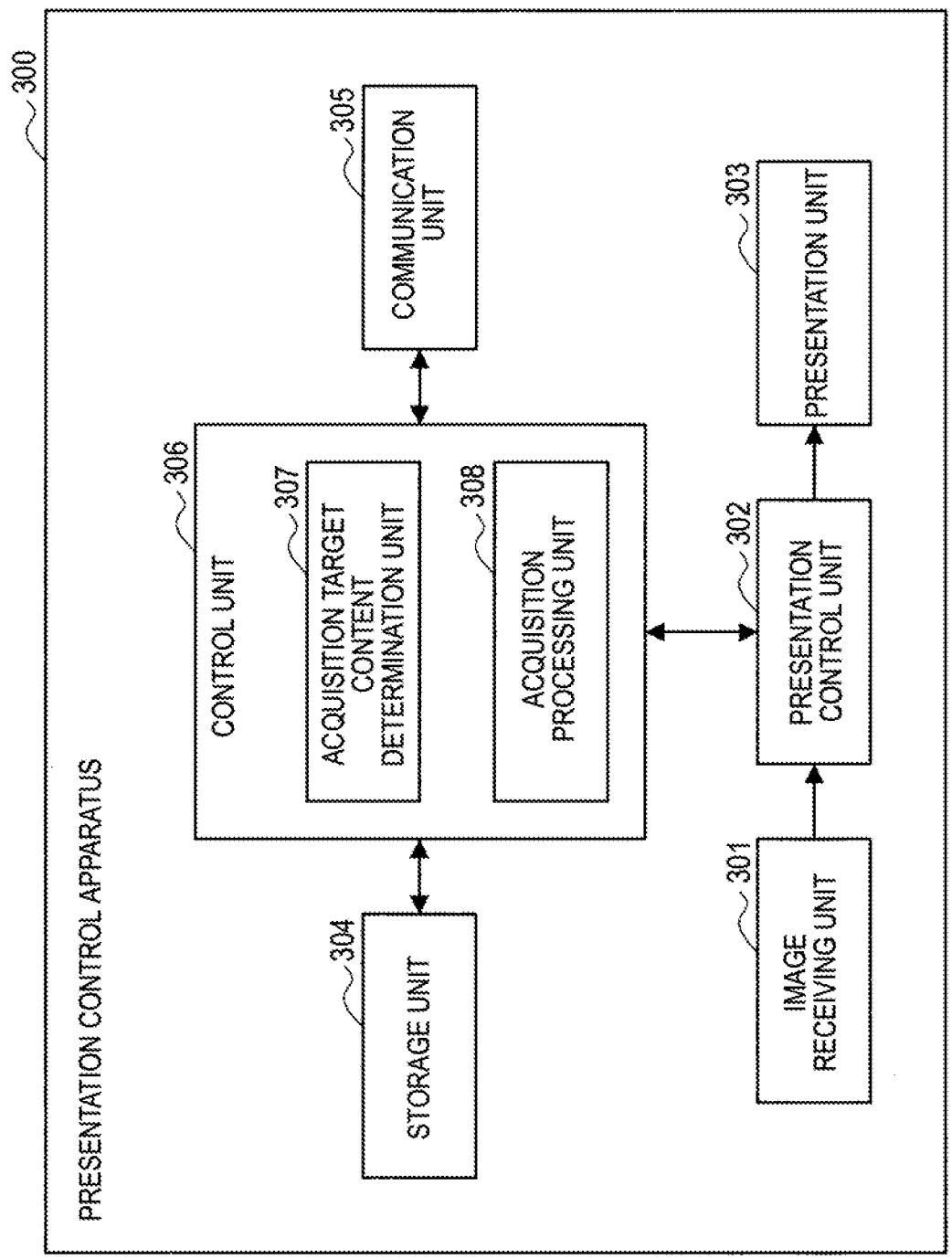
FIG. 8 is a block diagram illustrating a presentation control apparatus according to the same embodiment.

Next, a configuration of the presentation control apparatus 300 will be described with reference to FIG. 8. The presentation control apparatus 300 includes an image receiving unit 301, a presentation control unit 302, a presentation unit 303, a storage unit 304, a communication unit 305, and a control unit 306. In other words, the presentation control apparatus 300 has hardware structures such as a CPU, a ROM, a RAM, a hard disk, a display, and a communication antenna, and the above-described constituent elements are realized by the hardware structures. In addition, the storage unit 304 stores programs for causing the presentation control apparatus 300 to realize the respective functional blocks, particularly, an acquisition target content determination unit 307 and an acquisition processing unit 308.

The image receiving unit 301, the presentation control unit 302, the presentation unit 303, the storage unit 304, and the communication unit 305 are the same as the image receiving unit 31, the presentation control unit 32, the presentation unit 33, the storage unit 34, and the communication unit 35 according to the first embodiment. The control unit 306 controls the respective constituent elements of the presentation control apparatus 300 and functions as the acquisition target content determination unit 307 and the acquisition processing unit 308. A detailed description thereof will be described later.

[2-4. Example of Process Performed by Information Processing System]

Figure 9:
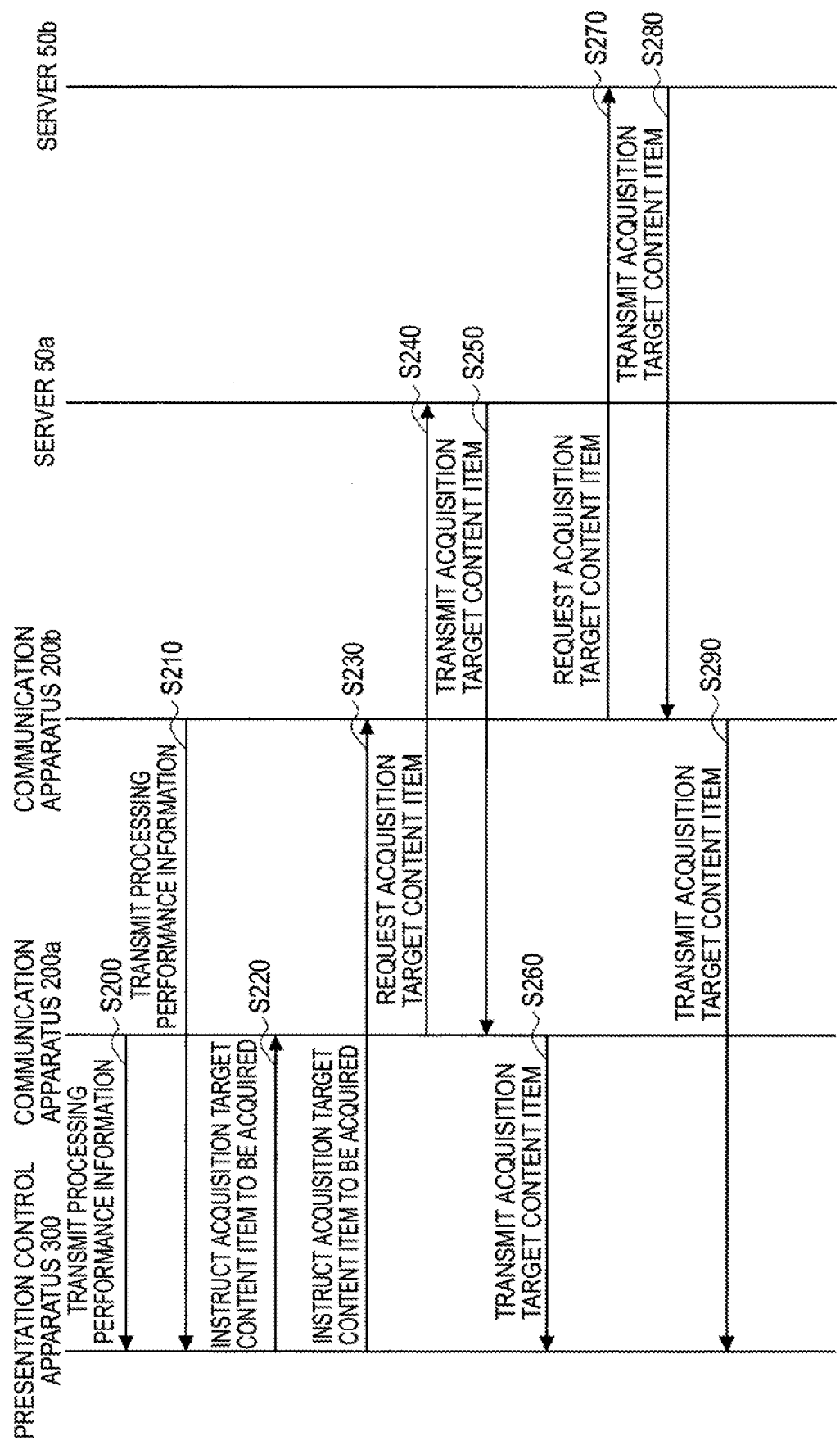
FIG. 9 is a sequence diagram illustrating an example of the process performed by the information processing system.

Next, an example of the process performed by the information processing system 11 will be described with reference to the sequence diagram shown in FIG. 9. In this example, the communication apparatus 200*a* supports a web service A, and the communication apparatus 200*b* supports web services B and C.

In addition, the server 50*a* provides the web service A, and the server 50*b* provides the web services B and C. Further, it is assumed that, unless particularly described, the communication apparatuses 200 wirelessly communicate with the presentation control apparatus 300.

First, a user of the communication apparatus 200*a* causes the presentation control apparatus 300 to present a desired reference content item using the communication apparatus 200*a*. The process at this time is the same as that in the first embodiment.

Next, in step S200, the control unit 205*a* of the communication apparatus 200*a* generates processing performance information regarding a processing speed, a communication rate and the first supportable service of the content acquisition unit 203*a*, and outputs the processing performance information to the content acquisition unit 203*a*. The content acquisition unit 203*a* transmits the processing performance information to the presentation control apparatus 300.

Similarly, in step S210, the control unit 205*b* of the communication apparatus 200*b* generates processing performance information regarding a processing speed, a communication rate and the second supportable service of the content acquisition unit 203*b*, and outputs the processing performance information to the content acquisition unit 203*b*. The content acquisition unit 203*b* transmits the processing performance information to the presentation control apparatus 300.

In step S220, the communication unit 305 of the presentation control apparatus 300 receives the processing performance information transmitted from the communication apparatus 200*a* and outputs the processing performance information to the acquisition target content determination unit 307. The acquisition target content determination unit 307 performs the above-described related content acquisition reservation process for each first supportable service. In this example, the first supportable service is the "web service A", and a related content acquisition situation regarding the "web service A" is "non-acquired". Therefore, the acquisition target content determination unit 307 updates the related content acquisition state regarding the "web service A" to "reserved". Thereby, the first reserved web service becomes the "web service A".

The acquisition target content determination unit 307 performs the related content acquisition reservation process for all the first supportable services, thereby updating the related content acquisition situation table. Next, the acquisition target content determination unit 307 determines an acquisition target content item which is a target acquired by the content acquisition unit 203*a* among related content items related to the reference content item, on the basis of the processing speed, the communication rate and the first reserved web service of the content acquisition unit 203*a*. A detailed determination method is the same as that in the first embodiment.

The acquisition processing unit 308 performs a process for causing the content acquisition unit 203*a* of the communication apparatus 200*a* to acquire an acquisition target content item. Specifically, the acquisition processing unit 308 outputs search condition information regarding search conditions to the communication unit 305. The communication unit 305 transmits the search condition information to the communication apparatus 200*a*. The content acquisition unit 203*a* of the communication apparatus 200*a* receives the search condition information.

On the other hand, in step S230, the communication unit 305 of the presentation control apparatus 300 receives the processing performance information transmitted from the communication apparatus 200*b*, and outputs the processing performance information to the acquisition target content determination unit 307. The acquisition target content determination unit 307 performs the above-described related content acquisition reservation process for each second supportable service. In this example, the second supportable services are the "web service B" and the "web service C", and related content acquisition states of the "web service B" and the "web service C" are "non-acquired". Therefore, the acquisition target content determination unit 307 updates the related content acquisition states of the "web service B" and the "web service C" to "reserved". Thereby, the second reserved web services become the "web service B" and the "web service C".

The acquisition target content determination unit 307 performs the related content acquisition reservation process for all the second supportable services, thereby updating the related content acquisition situation table. Next, the acquisition target content determination unit 307 determines an acquisition target content item which is a target acquired by the content acquisition unit 203*b* among related content items related to the reference content item, on the basis of the processing speed, the communication rate and the second reserved web services of the content acquisition unit 203*b*. A detailed determination method is the same as that in the first embodiment.

The acquisition processing unit 308 performs a process for causing the content acquisition unit 203*b* of the communication apparatus 200*b* to acquire an acquisition target content item. Specifically, the acquisition processing unit 308 outputs search condition information regarding search conditions to the communication unit 305. The communication unit 305 transmits the search condition information to the communication apparatus 200*b*. The content acquisition unit 203*b* of the communication apparatus 200*b* receives the search condition information.

In step S240, the content acquisition unit 203*a* transmits the search condition information to the server 50*a*. In step S250, the server 50*a* searches for a content item satisfying the search conditions, that is, the acquisition target content item from content items stored therein, on the basis of the search condition information. The server 50*a* transmits the searched acquisition target content item to the communication apparatus 200*a*.

In step S260, the content acquisition unit 203*a* receives the acquisition target content item which is output to the presentation control apparatus 300. On the other hand, the content acquisition unit 203*a* outputs the received acquisition target content item to the control unit 205*a*. The control unit 205*a* stores the acquisition target content item in the storage unit 204*a*. In addition, the control unit 205*a* may cause the presentation unit 201*a* to present the acquisition target content item. Further, the control unit 205*a* may share the acquisition target content item stored in the storage unit 204*a* with the other communication apparatus 200*b*.

The communication unit 305 of the presentation control apparatus 300 receives the acquisition target content item which is output to the control unit 306. The control unit 306 stores the acquisition target content item in the storage unit 304 and outputs the acquisition target content item to the presentation control unit 302. The control unit 306 updates the related content acquisition situation table on the basis of the acquisition target content item. In other words, the control unit 306 updates the related content acquisition situation state of the row corresponding to the acquisition target content item to "acquired". The presentation control unit 302 causes the presentation unit 303 to present the acquisition target content item or meta-information included in the acquisition target content item. In addition, the acquisition target content item stored in the storage unit 304 may be used by other applications. Further, the acquisition target content item may be meta-information of a reference content item.

On the other hand, in step S270, the content acquisition unit 203b transmits the search condition information to the server 50b. In step S280, the server 50b searches for a content item satisfying the search conditions, that is, the acquisition target content item from content items stored therein, on the basis of the search condition information. The server 50b transmits the searched acquisition target content item to the communication apparatus 200b.

In step S290, the content acquisition unit 203b receives the acquisition target content item which is output to the presentation control apparatus 300. On the other hand, the content acquisition unit 203b outputs the received acquisition target content item to the control unit 205b. The control unit 205b stores the acquisition target content item in the storage unit 204b. In addition, the control unit 205b may cause the presentation unit 201b to present the acquisition target content item. Further, the control unit 205b may share the acquisition target content item stored in the storage unit 204b with the other communication apparatus 200a.

The communication unit 305 of the presentation control apparatus 300 receives the acquisition target content item which is output to the control unit 306. The control unit 306 stores the acquisition target content item in the storage unit 304 and outputs the acquisition target content item to the presentation control unit 302. The control unit 306 updates the related content acquisition situation table on the basis of the acquisition target content item. In other words, the control unit 306 updates the related content acquisition situation state of the row corresponding to the acquisition target content item to "acquired". The presentation control unit 302 causes the presentation unit 303 to present the acquisition target content item or meta-information included in the acquisition target content item. In addition, the acquisition target content item stored in the storage unit 304 may be used by other applications. Further, the acquisition target content item may be meta-information of a reference content item.

As above, according to the information processing system 11 related to the second embodiment, it is possible to achieve the same effects as in the first embodiment. Particularly, in the information processing system 11 related to the second embodiment, since the presentation control apparatus 300 has the acquisition target content determination unit 307 and the acquisition processing unit 308, acquisition situations of related content items by the respective communication apparatuses 200a and 200b are collectively managed on the presentation control apparatus 300 side.

Thereby, since it is not necessary to transmit and receive the related content acquisition situation table between the presentation control apparatus 300 and the communication apparatuses 200a and 200b, processing efficiency is improved. For example, in the first embodiment, the presentation control apparatus 300 sequentially transmits the related content acquisition situation table to the communication apparatuses 20a and 20b such that the communication apparatuses 20a and 20b do not reserve the same web service. However, in the second embodiment, it is not necessary to transmit the related content acquisition situation table between the presentation control apparatus 300 and the communication apparatuses 200a and 200b in the first place. In addition, after receiving the processing performance information from the communication apparatuses 200a and 200b, the presentation control apparatus 300 can comprehensively update the related content acquisition situation table, on the basis of the received information.

<3. Third Embodiment>

[3-1. Overall Configuration]

Next, the third embodiment will be described. First, with reference to FIG. 1, an overall configuration of an information processing system 12 according to the third embodiment will be described. The information processing system 12 includes communication apparatuses 210a and 210b, a presentation control apparatus 310, a communication network 40, servers (information processing apparatus) 500a and 500b, and a relay 60. As such, in the third embodiment, the configurations of the communication apparatuses, the presentation control apparatus, and the servers are different from that those in the first embodiment. Therefore, the third embodiment will be described mainly based on these differences.

[3-2. Configuration of Communication Apparatus]

Figure 10:
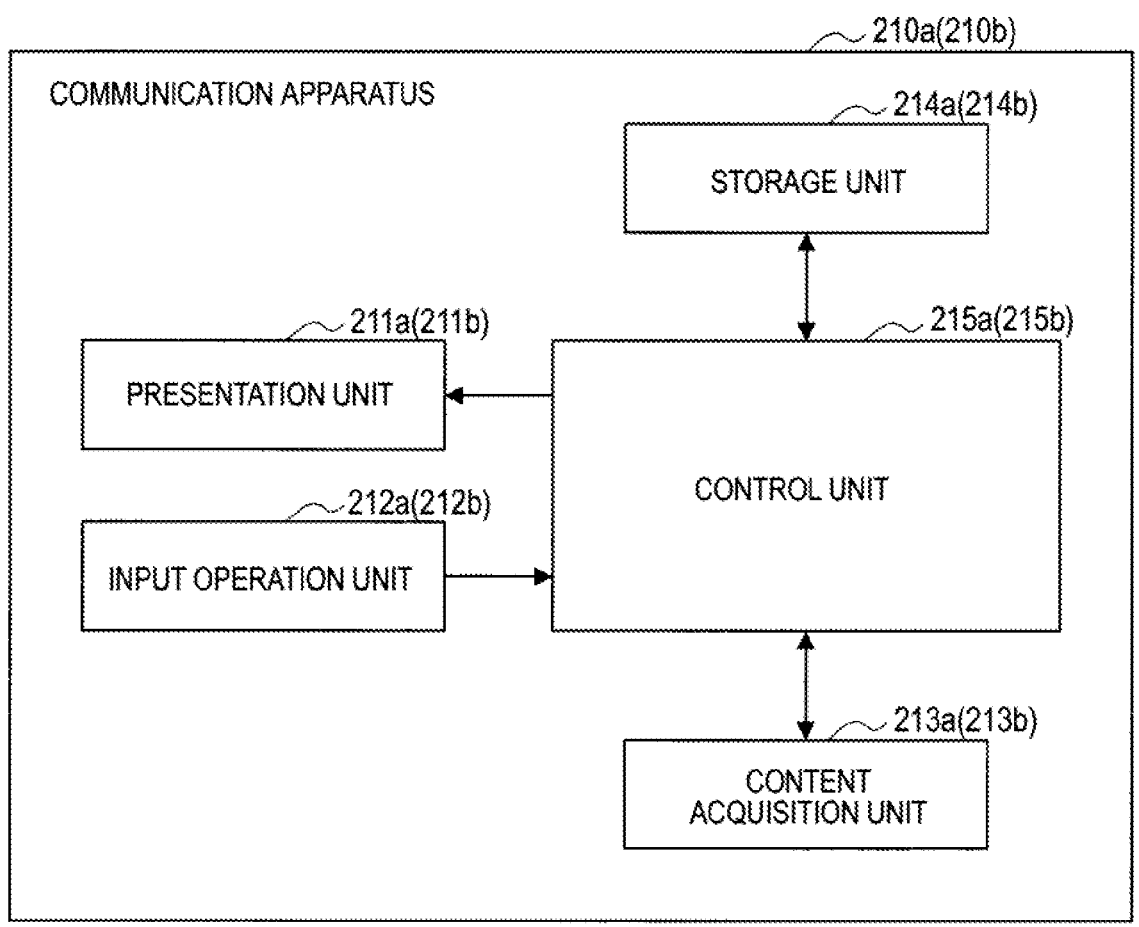
FIG. 10 is a block diagram illustrating a communication apparatus according to a third embodiment.

Next, with reference to FIG. 10, a configuration of the communication apparatus 210a according to the third embodiment will be described. As shown in FIG. 10, the communication apparatus 210a includes a presentation unit 211a, an input operation unit 212a, a content acquisition unit 213a, a storage unit 214a, and a control unit 215a. In other words, the communication apparatus 210a has hardware structures such as a CPU, a ROM, a RAM, a touch panel, a display, and a communication antenna, and the above-described constituent elements are realized by the hardware structures.

The presentation unit 211a, the input operation unit 212a, the content acquisition unit 213a, and the storage unit 214a are the same as the presentation unit 21a, the input operation unit 22a, the content acquisition unit 23a, and the storage unit 24a according to the first embodiment. The control unit 215a controls the respective constituent elements of the communication apparatus 210a. In addition, the control unit 215a generates processing performance information regarding a processing speed, a communication rate, and first supportable services of the content acquisition unit 213a, so as to be output to the content acquisition unit 213a. The content acquisition unit 213a transmits the processing performance information to the server 500a.

The communication apparatus 210b includes a presentation unit 211b, an input operation unit 212b, a content acquisition unit 213b, a storage unit 214b, and a control unit 215b. Functions of the constituent elements are the same as those in the communication apparatus 210a.

[3-3. Configuration of Presentation Control Apparatus]

Figure 11:
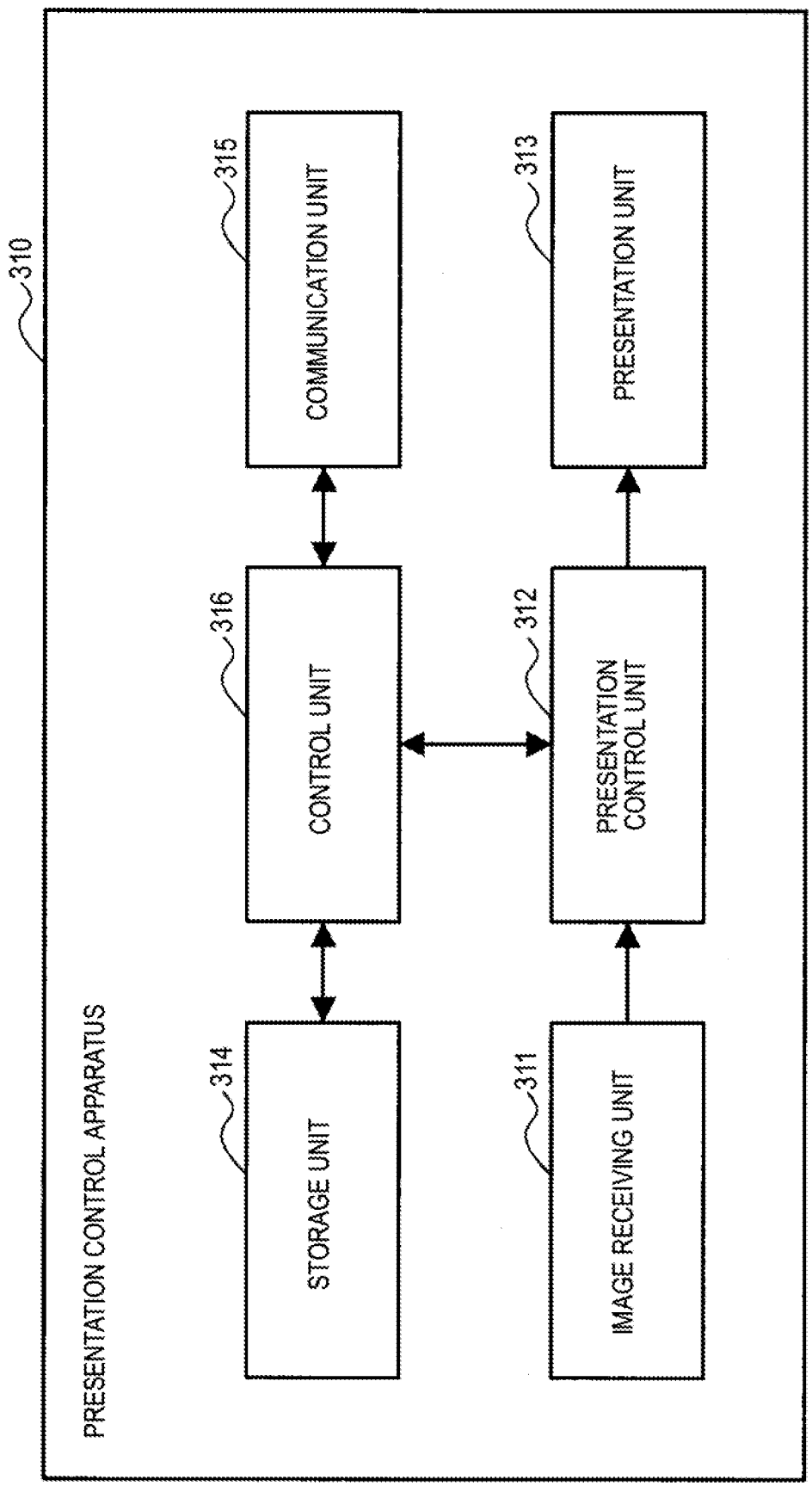
FIG. 11 is a block diagram illustrating a presentation control apparatus according to the same embodiment.

Next, a configuration of the presentation control apparatus 310 will be described with reference to FIG. 11. The presentation control apparatus 310 includes an image receiving unit 311, a presentation control unit 312, a presentation unit 313, a storage unit 314, a communication unit 315, and a control unit 316. In other words, the presentation control apparatus 310 has hardware structures such as a CPU, a ROM, a RAM, a hard disk, a display, and a communication antenna, and the above-described constituent elements are realized by the hardware structures.

The image receiving unit 311, the presentation control unit 312, the presentation unit 313, the storage unit 314, and the communication unit 315 are the same as the image receiving unit 31, the presentation control unit 32, the presentation unit 33, the storage unit 34, and the communication unit 35 according to the first embodiment. The control unit 316 controls the respective constituent elements of the presentation control apparatus 310 and outputs meta-information or a related content acquisition situation table to the communication unit 315. The communication unit 315 transmits the information to the servers 500a and 500b. A detailed description thereof will be described later.

[3-4. Configuration of Server]

Figure 12:
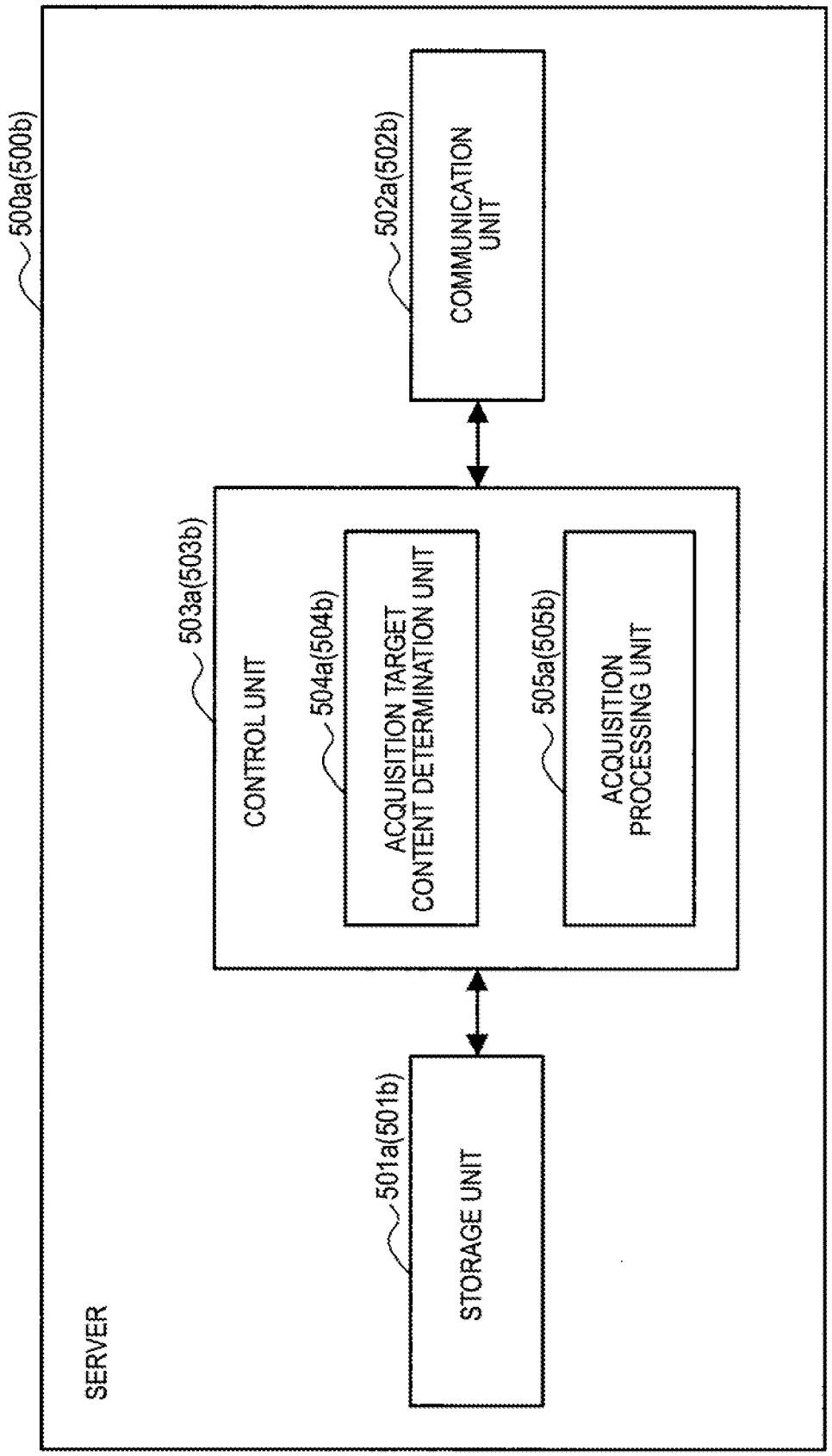
FIG. 12 is a block diagram illustrating a server according to the same embodiment.

Next, configurations of the servers 500a and 500b will be described with reference to FIG. 12. The server 500a includes a storage unit 501a, a communication unit 502a, and a control unit 503a. The storage unit 501a stores a variety of information, for example, various image content items, audio content items, programs, and the like which are necessary for the server 500a to perform processes, for example, to provide web services. The programs cause the server 500a to realize the respective functional blocks, particularly, an acquisition target content determination unit 504a and an acquisition processing unit 505a.

The communication unit 502a communicates with the communication apparatuses 210a and 210b or the presentation control apparatus 310 via the communication network 40. The control unit 503a controls the respective constituent elements of the server 500a and functions as the acquisition target content determination unit 504a and the acquisition processing unit 505a.

The server 500b includes a storage unit 501b, a communication unit 502b, and a control unit 503b. The constituent elements are the same as the constituent elements of the server 500a. Processes performed by the servers 500a and 500b will be described.

[3-5. Example of Process Performed by Information Processing System]

Next, an example of the process performed by the information processing system 12 will be described with reference to the sequence diagram shown in FIG. 13. In this example, the communication apparatus 210a supports a web service A, and the communication apparatus 210b supports web services B and C.

In addition, the server 500a provides the web service A, and the server 500b provides the web services B and C. Further, it is assumed that, unless particularly described, the communication apparatuses 210a and 210b wirelessly communicate with the presentation control apparatus 310.

First, a user of the communication apparatus 210a causes the presentation control apparatus 310 to present a desired reference content item using the communication apparatus 210a. The process at this time is the same as that in the first embodiment. Next, in step S300, the control unit 503a of the server 500a generates meta-information request information indicating a request for meta-information of a reference content item, and outputs the meta-information request information to the communication unit 502a. The communication unit 502a transmits the meta-information request information to the presentation control apparatus 310.

In step S310, the communication unit 315 of the presentation control apparatus 310 receives the meta-information request information which is output to the control unit 316. The control unit 316 acquires the meta-information from the storage unit 314 and outputs the meta-information to the communication unit 315. The communication unit 315 transmits the meta-information to the server 500a. The communication unit 502a of the server 500a receives the meta-information which is output to the control unit 503a, and the control unit 503a stores the meta-information in the storage unit 501a.

Thereafter, in step S320, the control unit 503a generates related content acquisition situation table request information indicating a request for the related content acquisition situation table, so as to be output to the communication unit 502a. The communication unit 502a transmits the related content acquisition situation table request information to the presentation control apparatus 310.

In step S330, the communication unit 315 of the presentation control apparatus 310 receives the related content acquisition situation table request information which is output to the control unit 316. The control unit 316 acquires the related content acquisition situation table from the storage unit 314 which is output to the communication unit 315. The communication unit 315 transmits the related content acquisition situation table to the server 500a.

The communication unit 502a of the server 500a outputs the related content acquisition situation table to the control unit 503a. The control unit 503a stores the related content acquisition situation table in the storage unit 501a.

In step S340, the control unit 503a generates processing performance request information indicating a request for processing performance information so as to be output to the communication unit 502a. The communication unit 502a transmits the processing performance request information to the communication apparatus 210a. The content acquisition unit 213a of the communication apparatus 210a outputs the processing performance request information to the control unit 215a.

In step S350, the control unit 215a generates processing performance information regarding a processing speed and a communication rate and the first supportable service of the content acquisition unit 213a, and outputs the processing performance information to the content acquisition unit 213a. The content acquisition unit 213a transmits the processing performance information to the server 500a. The communication unit 502a of the server 500a receives the processing performance information.

In step S360, the communication unit 502a outputs the processing performance information to the acquisition target content determination unit 504a. The acquisition target content determination unit 504a performs the above-described related content acquisition reservation process for each web service (hereinafter, also referred to as a "first provision service") which is provided by the server 500a among first supportable services indicated by the processing performance information.

In this example, the first provision service is the "web service A", and a related content acquisition situation regarding the "web service A" is "non-acquired". Therefore, the acquisition target content determination unit 504a updates the related content acquisition state regarding the "web service A" to "reserved". Thereby, the first reserved web service becomes the "web service A".

The acquisition target content determination unit 504a performs the related content acquisition reservation process for all the first supportable services, thereby updating the related content acquisition situation table.

The acquisition target content determination unit 504a outputs the updated related content acquisition situation table to the communication unit 502a, and the communication unit 502a transmits the related content acquisition situation table to the presentation control apparatus 310.

In step S370, the communication unit 315 of the presentation control apparatus 310 receives the related content acquisition situation table, that is, the updated related content acquisition situation table which is output to the control unit 316. The control unit 316 compares the related content acquisition situation tables before and after being updated, thereby specifying the first reserved web service. The control unit 316 stores the updated related content acquisition situation table in the storage unit 314. In addition, the control unit 316 generates reservation completion information indicating that reservation of the related content acquisition is completed, and outputs the reservation completion information to the communication unit 315. The communication unit 315 transmits the reservation completion information to the server 500a. In addition, if there is no first reserved web service, the control unit 316 does not transmit the reservation completion information, and the flow proceeds to step S400.

In step S380, the communication unit 502a of the server 500a receives the reservation completion information which is output to the acquisition target content determination unit 504a. The acquisition target content determination unit 504a determines an acquisition target content item which is a target acquired by the content acquisition unit 213a among related content items related to the reference content item, on the basis of the processing speed, communication rate and the first reserved web service of the content acquisition unit 213a.

Specifically, the server 500a determines search conditions in the same manner as the first embodiment, and acquires a content item satisfying the determined search conditions, that is, the acquisition target content item from the storage unit 501a.

The acquisition processing unit 505a performs a process for causing the content acquisition unit 213a of the communication apparatus 210a to acquire the acquisition target content item. Specifically, the acquisition processing unit 505a outputs the acquisition target content item to the communication unit 502a. The communication unit 502a transmits the acquisition target content item to the communication apparatus 210a. The content acquisition unit 213a of the communication apparatus 210a receives the acquisition target content item.

In step S390, the content acquisition unit 213a transmits the acquisition target content item to the presentation control apparatus 310 and outputs the acquisition target content item to the to the control unit 215a. The control unit 215a stores the acquisition target content item in the storage unit 214a. In addition, the control unit 215a may cause the presentation unit 211a to present the acquisition target content item. Further, the control unit 215a may share the acquisition target content item stored in the storage unit 214a with the other communication apparatus 210b.

The communication unit 315 of the presentation control apparatus 310 receives the acquisition target content item which is output to the control unit 316. The control unit 316 stores the acquisition target content item in the storage unit 314 and outputs the acquisition target content item to the presentation control unit 312. The control unit 316 updates the related content acquisition situation table on the basis of the acquisition target content item. In other words, the control unit 316 updates the related content acquisition situation state of the row corresponding to the acquisition target content item to "acquired". The presentation control unit 312 causes the presentation unit 313 to present the acquisition target content item or meta-information included in the acquisition target content item. In addition, the acquisition target content item stored in the storage unit 314 may be used by other applications. Further, the acquisition target content item may be meta-information of a reference content item.

In steps S400 to S490, the same processes as in steps S300 to S390 are performed. In other words, in step S400, the control unit 503b of the server 500b generates meta-information request information, and outputs the meta-information request information to the communication unit 502b. The communication unit 502b transmits the meta-information request information to the presentation control apparatus 310.

In step S410, the communication unit 315 of the presentation control apparatus 310 receives the meta-information request information which is output to the control unit 316. The control unit 316 acquires the meta-information from the storage unit 314 and outputs the meta-information to the communication unit 315. The communication unit 315 transmits the meta-information to the server 500b. The communication unit 502b of the server 500b receives the meta-information which is output to the control unit 503b, and the control unit 503b stores the meta-information in the storage unit 501b.

Thereafter, in step S420, the control unit 503b generates related content acquisition situation table request information indicating a request for the related content acquisition situation table, so as to be output to the communication unit 502b. The communication unit 502b transmits the related content acquisition situation table request information to the presentation control apparatus 310.

In step S430, the communication unit 315 of the presentation control apparatus 310 receives the related content acquisition situation table request information which is output to the control unit 316. The control unit 316 acquires the related content acquisition situation table from the storage unit 314 which is output to the communication unit 315. The communication unit 315 transmits the related content acquisition situation table to the server 500b.

The communication unit 502b of the server 500b outputs the related content acquisition situation table to the control unit 503b. The control unit 503b stores the related content acquisition situation table in the storage unit 501b.

In step S440, the control unit 503b generates processing performance request information indicating a request for processing performance information so as to be output to the communication unit 502b. The communication unit 502b transmits the processing performance request information to the communication apparatus 210b. The content acquisition unit 213b of the communication apparatus 210b outputs the processing performance request information to the control unit 215b.

In step S450, the control unit 215b generates processing performance information regarding a processing speed, a communication rate and the second supportable service of the content acquisition unit 213b, and outputs the processing performance information to the content acquisition unit 213b. The content acquisition unit 213b transmits the processing performance information to the server 500b. The communication unit 502b of the server 500b receives the processing performance information.

In step S460, the communication unit 502b outputs the processing performance information to the acquisition target content determination unit 504b. The acquisition target content determination unit 504b performs the above-described related content acquisition reservation process for each web service (hereinafter, also referred to as a "second provision service") which is provided by the server 500b among second supportable services indicated by the processing performance information.

In this example, the second provision services are the "web service B" and the "web service C", and related content acquisition situations regarding the "web service B" and the "web service C" are "non-acquired". Therefore, the acquisition target content determination unit 504*b* updates the related content acquisition states regarding the "web service B" and the "web service C" to "reserved". Thereby, the second reserved web services become the "web service B" and the "web service C".

The acquisition target content determination unit 504*b* performs the related content acquisition reservation process for all the second supportable services, thereby updating the related content acquisition situation table.

The acquisition target content determination unit 504*b* outputs the updated related content acquisition situation table to the communication unit 502*b*, and the communication unit 502*b* transmits the related content acquisition situation table to the presentation control apparatus 310.

In step S470, the communication unit 315 of the presentation control apparatus 310 receives the related content acquisition situation table, that is, the updated related content acquisition situation table which is output to the control unit 316. The control unit 316 compares the related content acquisition situation tables before and after being updated, thereby specifying the second reserved web service. The control unit 316 stores the updated related content acquisition situation table in the storage unit 314. In addition, the control unit 316 generates reservation completion information indicating that reservation of the related content acquisition is completed, and outputs the reservation completion information to the communication unit 315. The communication unit 315 transmits the reservation completion information to the server 500*b*. In addition, if there is no second reserved web service, the control unit 316 does not transmit the reservation completion information, and finishes the processes shown in FIG. 13.

In step S480, the communication unit 502*b* of the server 500*b* receives the reservation completion information which is output to the acquisition target content determination unit 504*b*. The acquisition target content determination unit 504*b* determines an acquisition target content item which is a target acquired by the content acquisition unit 213*b* among related content items related to the reference content item, on the basis of the processing speed, communication rate and the second reserved web services of the content acquisition unit 213*b*.

Specifically, the server 500*b* determines search conditions in the same manner as the first embodiment, and acquires a content item satisfying the determined search conditions, that is, the acquisition target content item from the storage unit 501*b*.

The acquisition processing unit 505*b* performs a process for causing the content acquisition unit 213*b* of the communication apparatus 210*b* to acquire the acquisition target content item. Specifically, the acquisition processing unit 505*b* outputs the acquisition target content item to the communication unit 502*b*. The communication unit 502*b* transmits the acquisition target content item to the communication apparatus 210*b*. The content acquisition unit 213*b* of the communication apparatus 210*b* receives the acquisition target content item.

In step S490, the content acquisition unit 213*b* transmits the acquisition target content item to the presentation control apparatus 310 and outputs the acquisition target content item to the to the control unit 215*b*. The control unit 215*b* stores the acquisition target content item in the storage unit 214*b*. In addition, the control unit 215*b* may cause the presentation unit 211*b* to present the acquisition target content item. Further, the control unit 215*b* may share the acquisition target content item stored in the storage unit 214*b* with the other communication apparatus 210*a*.

The communication unit 315 of the presentation control apparatus 310 receives the acquisition target content item which is output to the control unit 316. The control unit 316 stores the acquisition target content item in the storage unit 314 and outputs the acquisition target content item to the presentation control unit 312. The control unit 316 updates the related content acquisition situation table on the basis of the acquisition target content item. In other words, the control unit 316 updates the related content acquisition situation state of the row corresponding to the acquisition target content item to "acquired". The presentation control unit 312 causes the presentation unit 313 to present the acquisition target content item or meta-information included in the acquisition target content item. In addition, the acquisition target content item stored in the storage unit 314 may be used by other applications. Further, the acquisition target content item may be meta-information of a reference content item.

As above, according to the information processing system 12 related to the third embodiment, it is possible to achieve the same effects as in the first embodiment. Particularly, in the information processing system 12 related to the third embodiment, the servers 500*a* and 500*b* respectively have the acquisition target content determination units 504*a* and 504*b* and the acquisition processing units 505*a* and 505*b*. Therefore, since the servers 500*a* and 500*b* themselves can determine an acquisition target content item, it is not necessary to transmit the search condition information to the servers 500*a* and 500*b*. Thus, processing efficiency is improved. In addition, the information processing system 12 can determine an acquisition target content item more accurately.

As above, although the embodiments of the present disclosure have been described with reference to the accompanying drawings, the technical scope of the present disclosure is not limited to these examples. It is apparent that a person skilled in the art can conceive of a variety of modifications or alternations within the scope of the technical spirit recited in the appended claim, and it is understood that they are naturally included in the technical scope of the present disclosure.

For example, the above-described first to third embodiments may be arbitrarily combined with each other. Specifically, among the communication apparatus, the presentation control apparatus, and the server, a plurality of kinds of constituent elements may have the acquisition target content determination unit and the acquisition processing unit. In a case where a plurality of kinds of constituent elements include the acquisition target content determination units, search conditions may be different for each acquisition target content determination unit. In addition, the information processing system may cause a user to select which content item is presented among acquisition target content items determined by the respective acquisition target content determination units. Further, the information processing system may set priorities for the respective acquisition target content determination units, and an acquisition target content item determined by the acquisition target content determination unit having the higher priority may be preferentially presented.

In addition, although, in the respective embodiments, the content acquisition unit, that is, the communication apparatus acquires a related content item from the server, a related content item may be acquired from other constituent elements. For example, in a case where the communication apparatus is connected to other information processing apparatuses of a user, for example, an audio apparatus, a PC, a gaming machine, and the like, via the communication network 40, the communication apparatus may acquire a related content item from such a constituent element. In addition, in a case where the communication apparatus itself has a related content item, this related content item may be provided to the presentation control apparatus.

Further, the following configurations are also included in the technical scope of the present disclosure.

(1) An information processing apparatus including an acquisition target content determination unit that determines an acquisition target content item which is a target acquired by a content acquisition unit among related content items related to a reference content item, on the basis of processing performance of the content acquisition unit which acquires various content items via a communication network and can communicate with a content presentation control unit which performs a control so as to present the reference content item; and an acquisition processing unit that causes the content acquisition unit to acquire the acquisition target content item.

(2) The information processing apparatus set forth in (1), wherein the content acquisition unit is provided in a plurality, and wherein the acquisition target content determination unit determines the acquisition target content item for one content acquisition unit on the basis of processing performance of the one content acquisition unit and an acquisition situation of the related content item by other content acquisition units.

(3) The information processing apparatus set forth in (2), wherein the acquisition target content determination unit determines the acquisition target content item for one content acquisition unit on the basis of a related content acquisition situation table in which an acquisition situation of the related content item by each of the content acquisition units is recorded.

(4) The information processing apparatus set forth in any one of (1) to (3), wherein the acquisition target content determination unit determines the acquisition target content item on the basis of at least one of a processing speed of the content acquisition unit, a communication rate on the communication network of the content acquisition unit, and a web service which can be supported by the content acquisition unit.

(5) The information processing apparatus set forth in any one of (1) to (4), wherein the acquisition target content determination unit determines the acquisition target content item on the basis of at least one of an installation position of the content presentation control unit, a presentation time point when the content presentation control unit presents the reference content item, the weather at the installation position and the presentation time point, characteristics of the content presentation control unit, characteristics of a user using the content presentation control unit, and rating of a web service.

(6) The information processing apparatus set forth in any one of (1) to (5), wherein the acquisition processing unit notifies the content acquisition unit of meta-information regarding the reference content item.

(7) An information processing method including determining an acquisition target content item which is a target acquired by a content acquisition unit among related content items related to a reference content item, on the basis of processing performance of the content acquisition unit which acquires various content items via a communication network and can communicate with a content presentation control unit which performs a control so as to present the reference content item; and causing the content acquisition unit to acquire the acquisition target content item.

(8) A program enabling a computer to realize an acquisition target content determination function of determining an acquisition target content item which is a target acquired by a content acquisition unit among related content items related to a reference content item, on the basis of processing performance of the content acquisition unit which acquires various content items via a communication network and can communicate with a content presentation control unit which performs a control so as to present the reference content item; and an acquisition processing function of causing the content acquisition unit to acquire the acquisition target content item.

(9) An information processing system including a reference content presentation control apparatus that performs a control so as to present a reference content item; a content acquisition unit which acquires various content items via a communication network and can communicate with the reference content presentation control unit; an acquisition target content determination unit that determines an acquisition target content item which is a target acquired by a content acquisition unit among related content items related to the reference content item, on the basis of processing performance of the content acquisition unit; and a communication apparatus that has an acquisition processing unit which causes the content acquisition unit to acquire the acquisition target content item.

(10) An information processing system including a communication apparatus that can acquire various content items via a communication network; a reference content presentation control unit that communicates with the communication apparatus and performs a control so as to present a reference content item; an acquisition target content determination unit that determines an acquisition target content item which is a target acquired by the communication apparatus among related content items related to the reference content item, on the basis of processing performance of the communication apparatus; and a content presentation control apparatus that has an acquisition processing unit which causes the communication apparatus to acquire the acquisition target content item.

(11) An information processing system including a communication apparatus that can acquire various content items via a communication network; a presentation control apparatus that communicates with the communication apparatus and performs a control so as to present a reference content item; an acquisition target content determination unit that determines an acquisition target content item which is a target acquired by the communication apparatus among related content items related to the reference content item, on the basis of processing performance of the communication apparatus; and a server that has an acquisition processing unit which causes the communication apparatus to acquire the acquisition target content item.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus wirelessly connectable to a presentation control apparatus and wirelessly connectable to a number of servers by way of a communication network, said information processing apparatus comprising:
   a content acquisition unit to wirelessly acquire various content items via the communication network from a server and to wirelessly communicate with a content presentation control unit of the presentation control apparatus;
   an acquisition target content determination unit to determine an acquisition target content item which is a target acquired by the content acquisition unit among related content items related to a reference content item on the basis of processing performance of the content acquisition unit; and an acquisition processing unit to cause the content acquisition unit to acquire the acquisition target content item, in which the content acquisition unit is operable to communicate with the content presentation control unit to enable the presentation control apparatus to present the reference content item thereat.

2. The information processing apparatus according to claim 1, wherein the content acquisition unit is provided in a plurality, and wherein the acquisition target content determination unit determines the acquisition target content item for one content acquisition unit on the basis of processing performance of the one content acquisition unit and an acquisition situation of the related content item by other content acquisition units.

3. The information processing apparatus according to claim 2, wherein the acquisition target content determination unit determines the acquisition target content item for one content acquisition unit on the basis of a related content acquisition situation table in which an acquisition situation of the related content item by each of the content acquisition units is recorded.

4. The information processing apparatus according to claim 1, wherein the acquisition target content determination unit determines the acquisition target content item on the basis of at least one of a processing speed of the content acquisition unit, a communication rate on the communication network of the content acquisition unit, and a web service which can be supported by the content acquisition unit.

5. The information processing apparatus according to claim 1, wherein the acquisition target content determination unit determines the acquisition target content item on the basis of at least one of an installation position of the content presentation control unit, a presentation time point when the content presentation control unit presents the reference content item, the weather at the installation position and the presentation time point, characteristics of the content presentation control unit, characteristics of a user using the content presentation control unit, and rating of a web service.

6. The information processing apparatus according to claim 1, wherein the acquisition processing unit notifies the content acquisition unit of meta-information regarding the reference content item.

7. An information processing method for use with an information processing apparatus wirelessly connectable to a presentation control apparatus and wirelessly connectable to a number of servers by way of a communication network, said method comprising:

wirelessly acquiring by use of a content acquisition unit various content items via the communication network from a server;

determining an acquisition target content item which is a target acquired by the content acquisition unit among related content items related to a reference content item on the basis of processing performance of the content acquisition unit; and causing the content acquisition unit to acquire the acquisition target content item, in which the content acquisition unit communicates with the content presentation control unit to enable the presentation control apparatus to present the reference content item thereat.

8. A non-transitory computer-readable medium having stored thereon a program which when executed enables a computer to realize:

a content acquisition unit to wirelessly acquire various content items via the communication network from a server and to wirelessly communicate with a content presentation control unit of a presentation control apparatus;

an acquisition target content determination function of determining an acquisition target content item which is a target acquired by a content acquisition unit among related content items related to a reference content item on the basis of processing performance of the content acquisition unit; and an acquisition processing function of causing the content acquisition unit to acquire the acquisition target content item, in which the content acquisition unit is operable to communicate with the content presentation control unit to enable the presentation control apparatus to present the reference content item thereat.

9. An information processing apparatus wirelessly connectable to a television apparatus and wirelessly connectable to a server by way of a communication network, said information processing apparatus comprising:

an input unit to enable a user to input information indicative of a reference content item;

a content acquisition unit to receive the information indicative of the reference content item and to wirelessly communicate with a presentation control unit of the television apparatus to obtain related content information pertaining to the reference content item;

a control unit, responsive to obtaining the related content information, to determine search condition information and to supply the search condition information to the content acquisition unit, the content acquisition unit being configured to supply the search condition information to the server so as to acquire a number of target content items therefrom related to the reference content item.

10. The information processing apparatus according to claim 9, in which the search condition information determined by the control unit includes a condition pertaining to at least one of processing speed or communication rate of the content acquisition unit so that the acquired number of target content items are based on the at least one of processing speed or communication rate of the content acquisition unit.

* * * * *